(12) United States Patent

Fleishman et al.

(10) Patent No.: US 9,501,716 B2
(45) Date of Patent: Nov. 22, 2016

(54) LABELING COMPONENT PARTS OF OBJECTS AND DETECTING COMPONENT PROPERTIES IN IMAGING DATA

(71) Applicant: Intel Corporation, Santa Clara, CA (US)

(72) Inventors: Shahar Fleishman, Hod Hasharon (IL); Mark Kliger, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 84 days.

(21) Appl. No.: 14/567,187

(22) Filed: Dec. 11, 2014

(65) Prior Publication Data

US 2016/0171340 A1    Jun. 16, 2016

(51) Int. Cl.
*G06K 9/00* (2006.01)
*G06K 9/48* (2006.01)
*G06K 9/66* (2006.01)

(52) U.S. Cl.
CPC ........... *G06K 9/481* (2013.01); *G06K 9/00355* (2013.01); *G06K 9/66* (2013.01)

(58) Field of Classification Search
None
See application file for complete search history.

(56) References Cited

U.S. PATENT DOCUMENTS

| 2013/0114902 | A1* | 5/2013 | Sukthankar | H04N 9/8205 382/190 |
| 2015/0117708 | A1* | 4/2015 | Guigues | G06T 7/0042 382/103 |
| 2015/0177846 | A1* | 6/2015 | Yin | G06K 9/00355 382/103 |

OTHER PUBLICATIONS

Jamie Shotton et al. "Real-Time Human Pose Recognition in Parts from a Single Depth Image", Microsoft Research, Jun. 2011, from WWW: http://research.microsoft.com/apps/pubs/?id=145347, 8 pages.

* cited by examiner

*Primary Examiner* — Stephen R Koziol
*Assistant Examiner* — Delomia L Gilliard
(74) *Attorney, Agent, or Firm* — Green, Howard & Mughal, LLP

(57) ABSTRACT

Techniques related to labeling component parts and detecting component properties in imaging data are discussed. Such techniques may include generating a feature vector including invariant features associated with an area of interest within an image of an object such as an image of a hand and providing a component label such as a hand part label for the area of interest based on an application of a machine learning classifier to the feature vector.

20 Claims, 10 Drawing Sheets

LABELING COMPONENT PARTS OF OBJECTS AND DETECTING COMPONENT PROPERTIES IN IMAGING DATA

BACKGROUND

Many consumer electronic devices include imaging devices that may attain images or series of images. Such images may be used to perform object detection, object recognition, gesture recognition, or the like. For example, objects may be identified and tracked for focusing the imaging device in image capture settings and recognized for attaching meta data (e.g., providing a name for a recognized face) and a variety of other purposes. Furthermore, gesture recognition may attempt to interpret human gestures typically made via the user's hands or face to provide input to the device for navigating the device, playing games, and so on. Such gesture recognition may allow users to interact with the device naturally and without an intervening mechanical interface such as a keyboard, mouse, or even touch display.

However, detecting, recognizing, and identifying (e.g., labeling) portions of images is difficult and computationally intensive. In particular, identifying or labeling fingers (e.g., accurately labeling a finger as a thumb, index finger, middle finger, ring finger, or little finger) is challenging as the position, orientation, size and shape of the hand may be widely variable within the attained image or images. Furthermore, existing techniques for performing such detection, recognition, and identification of areas of images may be computationally intensive and may consume substantial memory resources.

As such, existing techniques may not provide for robust and fast labeling for fingers of hands or other areas interest of detected objects. Such problems may become critical as the desire to provide object recognition and gesture based interaction for consumer electronic devices in a variety of settings becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
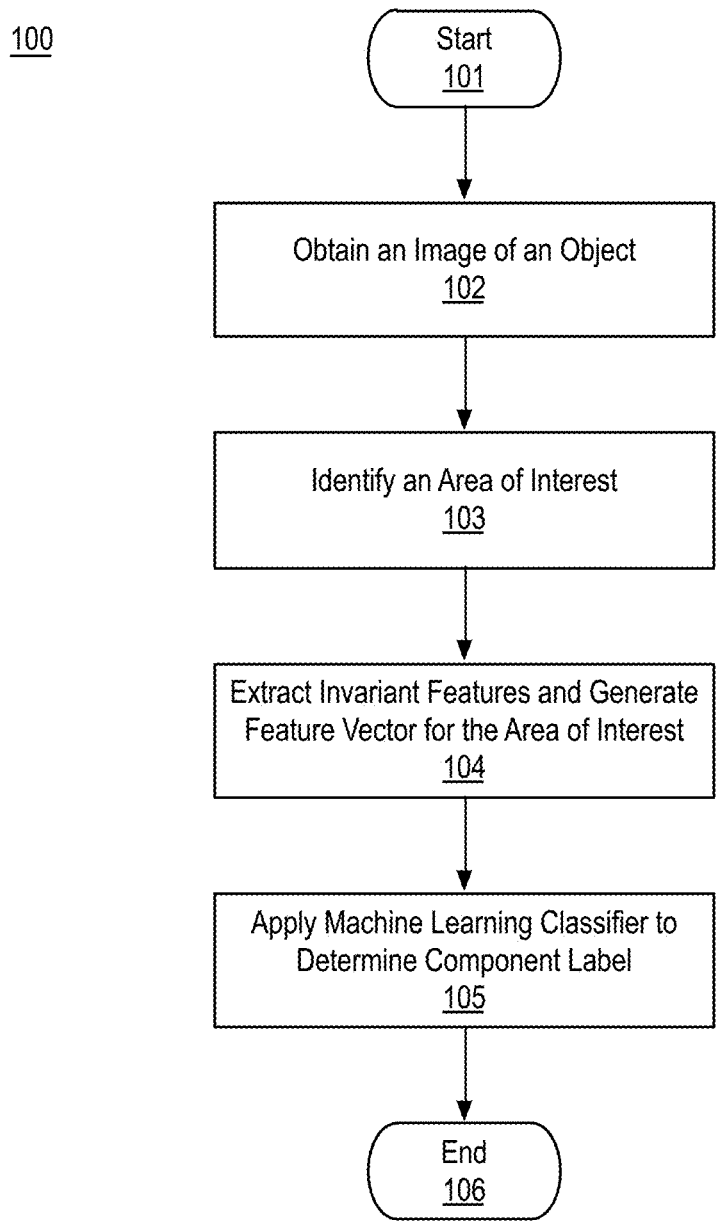
FIG. 1 is a flow diagram illustrating an example process for labeling areas of an image.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation.

Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, systems, and articles are described herein related to labeling areas of an image and, in particular, to labeling areas based on invariant feature vectors.

As described above, identifying or labeling portions of images is difficult and, in particular, identifying or labeling fingers (e.g., accurately labeling a finger as a thumb, index finger, middle finger, ring finger, or little finger), face parts, and body parts is challenging as the position, orientation, size and shape or pose of the object may vary widely. For example, the variability of a hand may be due to people having different hand sizes (e.g., identifying big or small hands, identifying hands of adults or children, and so on). Techniques discussed herein may provide for labeling areas of an image and, in particular, an area of interest of an object may be labeled with a component label. For example, the object may be a hand, which may be provided a label indicating a finger (e.g., a thumb, index finger, middle finger, ring finger, or little finger) to which the area of interest corresponds.

In some examples, an object may be detected within an input image and an area of interest (e.g., an area or region including a suspected finger, suspected body part, suspected face part, or the like) for the object may be determined. For example, the input image or a portion thereof may include a hand, which may be described as an image of a hand. In some examples, the area of interest may include a representation of a suspected finger or a portion thereof and the area of interest may include, for example, a finger axis, a finger base point, and/or a finger tip point for the suspected finger. A feature vector including multiple invariant features may be generated for the area of interest. For example, the invariant features may include scale, rotation, and position invariant features based on 2-dimensional (2D) imaging data, 3-dimensional (3D) imaging data, and/or semantic data, as is discussed further herein. In other examples, an object having areas of interest such as a body or a face may be detected and such processing may be performed for areas of interest such as body parts or face parts. The invariant features may be concatenated or the like to generate the feature vector or a portion thereof. A pre-trained machine learning classifier may be applied to the feature vector to determine a hand part label, body part label, or face part label for the area of interest. For example, a hand part label may include any suitable label such as a finger descriptor (e.g., a thumb, index finger, middle finger, ring finger, or little finger descriptor), a numerical value (e.g., 1 indicating thumb, 2 indicating index finger, 3 indicating middle finger, 4 indicating ring finger, and 5 indicating little finger), or the like. Similarly a body part label may include a descriptor (e.g., left arm, right, left leg, right leg, torso, head, etc.) or numerical indicator value associated with the body part label and a face part label may include a descriptor (e.g., left eye, right eye, nose, mouth, etc.) or numerical indicator value associated with the face part label.

Such a hand part label or labels, body part label or labels, facial label or labels, or the like may be used in a variety of contexts such as image recognition, gesture recognition or tracking, and the like. For example, hand part labels may be tracked over multiple frames both to correct the labels as needed (e.g., as hand position changes more and/or more accurate information regarding suspected fingers may become available) and as part of a gesture recognition process. For example, such hand part labels indicating an index finger and a thumb may be used to identify a pinching motion or a spreading motion or the like, which may in turn be used as inputs to zoom or shrink a view presented to the user or the like. Such hand part labels may therefore be used as part of a hand gesture recognition process or module in a wide variety of contexts.

FIG. 1 is a flow diagram illustrating an example process 100 for labeling areas of an image, arranged in accordance with at least some implementations of the present disclosure. Process 100 may include one or more operations 101-106 as illustrated in FIG. 1. Process 100 may be performed by a device (e.g., device 900 as discussed herein) or system (e.g., system 1100) to determine or provide a component label for an area of interest for an input image such as a hand part label for an image of a hand. Process 100 may be performed for an input image and process 100 may be repeated any number of times for such input images or portions thereof. Although discussed in particular aspects with respect to an example image including a hand to label hand parts, the operations of process 100 may be applied to any suitable object to label areas of interest within an image to provide component labels such as within an image of a body to label body parts or within an image of a face to label face parts, or the like.

As shown, process 100 may begin from start operation 101 at operation 102, "Obtain an Image of an Object", where an input image including an object such as a hand or other object (e.g., a body or face or the like) may be obtained via an image capture device (e.g., a camera) or memory or from another device or the like. The input image may include one or more input images of any type that include suitable imaging data. For example, the input image may include one or more of a 2D input image, a 3D input image, an infrared (IR) image, a depth image, a grayscale image, or a color image such as a red-green-blue (RGB) color model image, or the like. In some examples, the input image may be a 3D input image including a depth image and an IR image. In further examples, an RGB input image may also be provided to enhance the IR image with color information.

Furthermore, the input image or images may be attained via any suitable image capture device or devices such as 3D cameras, 2D cameras, IR cameras, or the like. In an example, the input into operation 102 includes a 3D image and an IR image. In other examples, the input image or images may be attained be attained from memory (e.g., memory of a device performing process 100) or from another device (e.g., a device remove from the device performing process 100). For example, the input image or images may be transferred via wireless communications or the like to a device for processing.

Figure 2A:
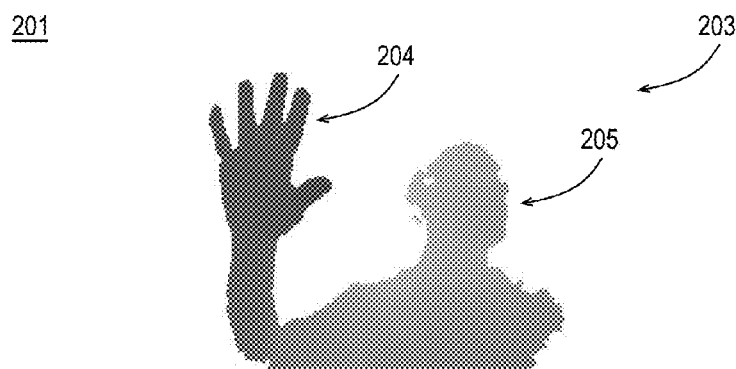
FIGS. 2A and 2B illustrate an example depth image and an example IR image.
Figure 2B:
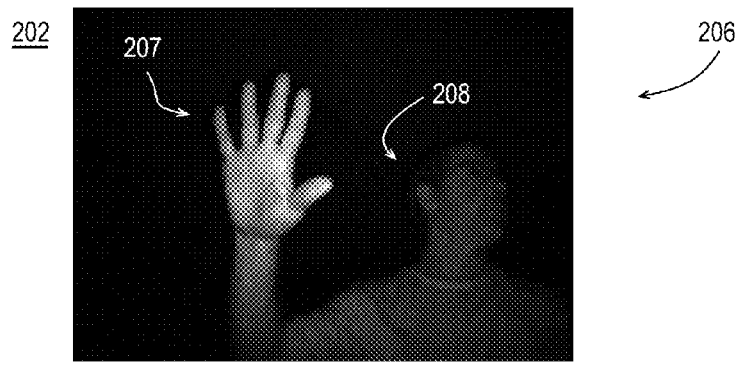

FIGS. 2A and 2B illustrate an example depth image 201 and an example IR image 202, arranged in accordance with at least some implementations of the present disclosure. For example, depth image 201 and/or IR image 202 may be provided as input image(s). As shown, depth image 201 may include information relating to the distance of the surfaces within a scene 203. For example, depth image 201 may include darker regions 204 and lighter regions 205. In the example of FIG. 2A, darker regions 204 may be closer to the viewpoint provided by, for example, a camera used to attain depth image 201 and lighter regions 205 may be further from such a viewpoint. For example, in depth image 201, pixel values may be based on a distance from a viewpoint or the like.

Also as shown, IR image 202 may include brighter regions 207 and darker regions 208 of a scene 206. For example, in generating IR image 202, the image sensor used to capture IR image 202 may be sensitive to near infrared light and may generate IR image using a wavelength that is very close to visible red light but still invisible to the human eye. For example, IR image 202 may be generated via a 3D camera by projecting light onto a scene to measure distances. Such invisible wavelength light may be used so that the projected light is not distracting to observers. For example, brighter regions 207 may be closer to the viewpoint provided by, for example, a camera used to attain IR image 202 and darker regions 208 may be further from such a viewpoint.

As discussed, in some examples, the input images for operation 102 may be a 3D input image including a depth image such as depth image 201 and an IR image such as IR image 202. Furthermore, in some examples, the input images may include a depth image, an IR image, and an RGB input image to enhance the IR image such as IR image 202 with color information.

Returning to FIG. 1, as discussed, the input image or images may include a hand or a portion of a hand or another object of interest or portion of an object of interest such as a face or a portion of a face or a body or a portion of a body. As used herein, an image of a hand, an image of an object, an image of a face, an image of a body, or the like may include any suitable image or imaging data including an image or representation of a hand, object, face, body, or the like. For example, an image of a hand may be an entire input image or a portion of an input image including the hand (or a portion thereof) for example. In some examples, an input image or images may include multiple objects of interest or portions thereof. In such examples, the input image may therefore have multiple images of object such as hands, faces, bodies, or the like. For example, an object such as a hand or hands within may be detected within the input image or images via any suitable object detection techniques. Such object detection techniques may be performed prior to operation 103 for example.

Process 100 may continue at operation 103, "Identify an Area of Interest", where an area of interest, such as a suspected finger of a hand, a suspected part of a body, a suspected face part of a face, or other suspected part of an object, or the like may be identified within an object image such as an image of an object. For example, the area of interest may be associated with or include a representation of a finger or a portion of a finger. The area of interest may include any suitable areas and/or elements of the input image that may represent a finger, a portion of a finger, or other area of interest. In some examples, an area of interest may provide a representation of a suspected finger or portion of a finger and may include elements such as a finger axis, a finger base point, and/or a finger tip point as discussed further with respect to FIGS. 3 and 4. In other examples, an area of interest may provide a representation of a suspected body part and the area of interest may provide a representation of a suspected body part and may include elements such as a body part (e.g., leg or arm or the like) axis, a body part base point, and/or a body part tip or end point. In yet other examples, an area of interest may provide a representation of a suspected face part and the area of interest may provide a representation of a suspected face part and may include elements such as a face part (e.g., eye, nose, eyebrow, mouth, or the like) axis, a face part base point, and/or a face part tip point.

For example, a finger axis, body part axis, or face part axis for the area of interest (e.g., suspected finger) may be determined using any suitable image processing techniques. In some examples, edge detection techniques may be implemented to detect, for example, individual fingers and approximate center axes of fingers. In some examples, a finger axis may be determined by applying a medial axis transform on an edge detected image to find suspected finger axes. The center axes may include individual line segments or piecewise continuous lines composed of up to three line segments or the like. For example, a finger axis for a suspected finger (e.g., area of interest) may include a single line or line segment for the entire suspected finger (which may be extended or folded) or multiple lines or line segments, each associated with a bone of the finger (e.g., up to three lines or line segments for the three bones or phalanges of the finger). Such multiple line segments may be particularly advantageous when a suspected finger is folded or posed such that it provides a non-linear shape or the like.

Furthermore, a finger base point, body part base point, or face part base point may be determined. In some examples, a finger base point may be determined based on a finger axis. The finger base point may be determined using any suitable technique or techniques. In some examples, edge detection techniques may be implemented to detect and locate the finger base point. For example, the finger base point may be a point on the finger axis at or near a location where an edge terminates or changes direction abruptly (e.g., adjacent to skin between fingers or the like). Although discussed in detail with respect to finger axes and finger base points, such processing may be applied to detect other object areas of interest such as body part axes, face part axes, body part base points, or face part base points, or the like.

Figure 3:
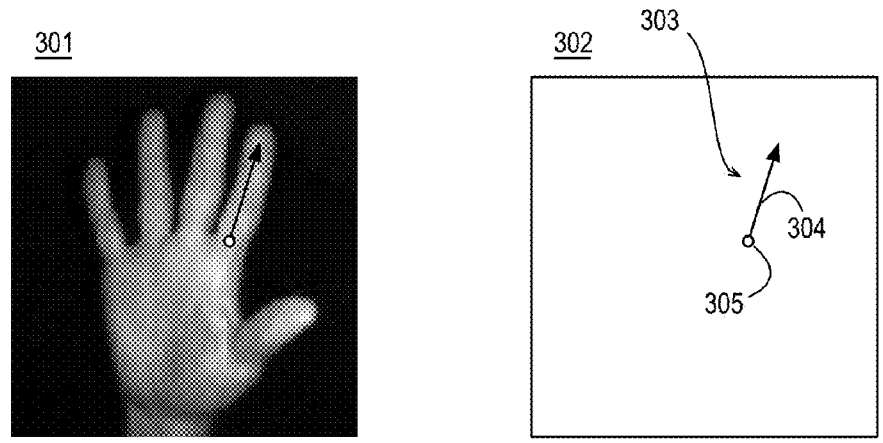
FIG. 3 illustrates an example finger axis and an example finger base point for an example hand image.

FIG. 3 illustrates an example finger axis 304 and an example finger base point 305 for an example hand image 301, arranged in accordance with at least some implementations of the present disclosure. In FIG. 3, hand image 301 may provide an example IR image for illustrative purposes; however, as discussed, any suitable input image format and any suitable object (e.g., a body or face or the like) may be implemented. In FIG. 3, an extended upright palm-forward hand is illustrated for the sake of clarity of presentation. However, the hand being evaluated via process 100 may be in any orientation and pose and may be of any size. The hand may be folded, partially folded, pointing, holding up a certain number of fingers (e.g., as when showing a certain number), presenting a pose for sign language, or the like. Furthermore a back of the hand may be facing the viewpoint and/or the hand may be sideways, downward facing, rotated, or the like. The techniques discussed herein may process any such shape and/or orientation and label areas of interest (e.g., suspected fingers) with hand labels, thereby providing a label for each suspected finger that is visible to the viewpoint or camera.

Furthermore, FIG. 3 illustrates hand image 301 showing finger axis 304 and finger base point 305 without labels and provides a field 302 that illustrates the same portion or area of hand image 301 with finger axis 304 and finger base point 305 labeled. Such a structure is provided in FIG. 3 and FIGS. 4-7 for the sake of clarity of presentation. As shown in FIG. 3, finger axis 304 and finger base point 305 may be associated with an area of interest 303. For example, area of interest 303 may include an area or region of hand image 301 (as shown via field 302) that may include a finger (e.g., area of interest 303 may include or represent a suspected finger). Area of interest 303 may be associated with one or both of finger axis 304 and finger base point 305 as shown.

In other examples, area of interest 303 may also be associated with a finger tip point. Furthermore, area of interest 303 may be associated with or include other features representative of a finger or suspected finger such as finger edges (e.g., finger edge lines or segments), finger joints (e.g., finger joint points), or the like.

Figure 4:
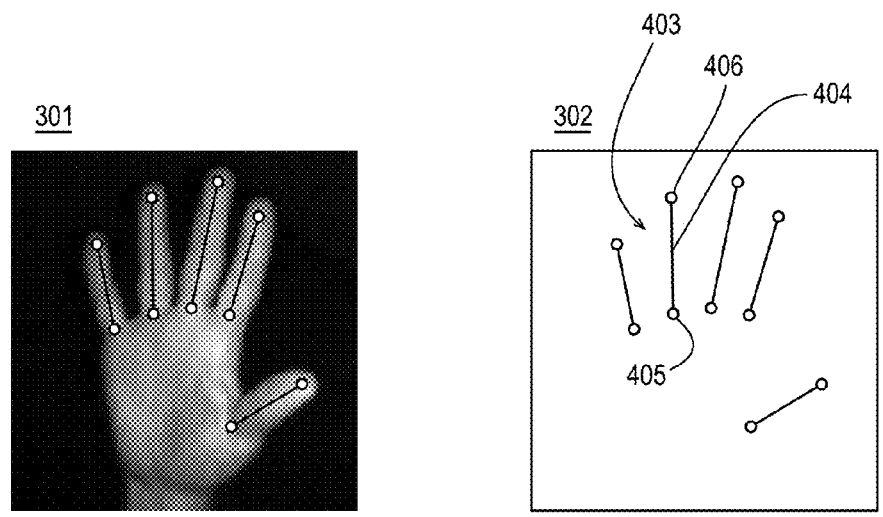
FIG. 4 illustrates example finger tip points, finger base points, and finger axes for example hand image.

As shown, finger axis 304 may be aligned with an index finger in hand image 301. In FIG. 3, only a single finger axis is shown for the sake of clarity of presentation. However, at operation 103, multiple finger axes may be determined such as one each for the little finger, ring finger, middle finger, and thumb in hand image 301 (as shown in FIG. 4). As discussed, finger axis 304 may be determined using any suitable techniques such as edge detection techniques or the like. In the example of FIG. 3, finger axis 304 includes a single line or line segment. In other examples, finger axis 304 may include multiple lines or line segments such as three line segments. In the example of FIG. 3, such multiple line segments would be substantially aligned as the index finger of hand image 301 is substantially extended.

Furthermore, FIG. 3 illustrates finger base point 305. As discussed, finger base point 305 may be determined using any suitable techniques such as edge detection techniques or the like. For example, edge detection techniques may be implemented to detect and locate finger base point 305. For example, finger base point 305 may be a point on finger axis 304 at or near a location where an edge terminates or changes direction abruptly. For example, in FIG. 3, the edge of the index finger adjacent to the middle finger may terminate or change direction abruptly at the skin between the index finger and the middle finger, which is adjacent to and to the left of finger base point 305. As with finger axis 304, in FIG. 3, only a single finger bases is shown for the sake of clarity of presentation. However, at operation 103, multiple finger bases may be determined such as one each for the little finger, ring finger, middle finger, and thumb in hand image 301 (as shown in FIG. 4).

Returning to FIG. 1, at operation 103, in addition to a finger axis and a finger base point, a finger tip point may optionally be determined for the area of interest (e.g., suspected finger). In other examples, such as face part examples or body part examples, face part tip or end points or body part tip or end points may be determined as discussed with respect to finger tip points. The finger tip point, face part end point, or body part end point may be determined using any suitable technique or techniques. In some examples, a finger tip point may be determined by detecting local minima points in a depth image such as depth image 201. In such examples, the finger tip point may correspond to a center of a region having local depth minima points surrounding the finger tip point. For example, such local depth minima points may be points in a depth image where pixels surrounding a center of the region have values farther away (e.g., from a viewpoint or camera or the like) than the center of the region. Such local minima depth points may indicate, for example, a finger tip pointing toward the viewpoint or camera since the pixels at the periphery are further away from the camera (e.g., they have higher depth values). Such local depth minima points may be determined for a hand blob (e.g., a region of an image associated with a hand). Such finger tip points may be used to provide or modify a finger axis or a finger axis may be used to identify finger tip points. For example, such local depth minima regions may be identified along or adjacent to a finger axis.

In other examples, a finger tip point, face part end point, or body part end point may be determined using edge detection techniques. For example, a finger tip point may be at or near a location along a finger axis where an edge is detected (e.g., and edge may be detected at the end of a finger and along a finger axis). In some examples, if a finger is extended, a finger tip may be detected at a center of a half-circle of the edge. However, as discussed, any technique or techniques may be used to detect finger tips and finger bases.

FIG. 4 illustrates example finger tip points 406, finger base points 405, and finger axes 404 for example hand image 301, arranged in accordance with at least some implementations of the present disclosure. As shown in FIG. 4, hand image 301 may include finger axes 404, finger base points 405, and finger tip points 406. In FIG. 4, only the finger axis, base point, and tip for the ring finger shown in hand image 301 are labeled in field 302 for the sake of clarity of presentation. Also, as shown in FIG. 3, finger axes 404, finger base points 405, and finger tip points 406 may be associated with areas of interest 403 (which is also only labeled for the ring finger shown in hand image 301). For example, for each suspected finger in hand image 301 (e.g., a suspected finger associated with each of the little finger, ring finger, middle finger, index finger, and thumb) an area of interest may be detected and each area of interest may include a finger axis, finger base point, and/or finger tip point. In the illustrated example, areas of interest 403 may each include one of finger axes 404, finger base points 405, and finger tip points 406. Furthermore, in some examples, areas of interest 403 may each be associated with or include other features representative of a finger or suspected finger such as finger edges, finger joints, or the like.

As shown, finger axes 404 may be aligned with (suspected) fingers in hand image 301 and may extend between finger base points 405 and finger tip points 406. In FIG. 4, only single finger axes are shown, however, as discussed finger axes 404 may have any number of line segments such as up to three line segments connected as piecewise linear functions. The illustrated finger axes 404, finger base points 405, and finger tip points 406 may be determined using any techniques such as those discussed herein.

Returning to FIG. 1, process 100 may continue from operation 103 to operation 104, "Extract Invariant Features and Generate Feature Vector for the Area of Interest", where invariant features (e.g., scale, rotation, and position invariant features) may be extracted or determined for an area of interest and a feature vector may be generated for the area of interest. At operation 104, a feature vector may be generated for each area of interest within an input image such as an image of a hand, an image of a body, or an image of a face for example. Such invariant features and machine learning classification as discussed herein may provide systems and techniques for labeling suspected fingers that are robust, accurate, and invariant to different hand sizes, different ranges from the viewpoint or camera, and different hand positions and orientations.

The invariant features determined at operation 104 may be any suitable invariant features such as 2D-image based features (e.g., invariant features based on a 2D input image), 3D-image based features (e.g., invariant features based on a 3D input image), semantic features such as semantic features based on a priori knowledge of human anatomy, or the like. For example, such 2D- and 3D-image based invariant features may be determined based on a size of the hand, finger position (e.g., position of the finger base point), finger orientation and shape (e.g., based on the finger axis) in hand labeling contexts, based on a size of the body, extremity positions (e.g., position of the body part base points), body part orientation and shape in body part labeling contexts, or based on a size of the face, face part position, face part orientation and shape in face part labeling contexts, or the like. Furthermore, semantic invariant features may be based on human hand anatomy as discussed further herein. Such invariant features may be concatenated into a feature vector such as an invariant feature vector, which may be evaluated via a machine learning classifier to label the area of interest (e.g., as a thumb, index finger, middle finger, ring finger, or little finger, or the like in hand labeling contexts) associated with the feature vector. Such a process may be repeated for each area of interest (e.g., suspected finger) in the input image, for example.

As discussed, in generating some 2D- and/or 3D-image based invariant features, a size of the hand or object of interest may be used. Such a hand size or object size may be determined using any suitable technique or techniques. For example, in 2D-input images including hands, a hand size may be determined based on a contour of the hand (e.g., an outline of the hand), a hand blob of the hand (e.g., a region of an image associated with a hand), size of a palm of the hand, or the like. In 3D-images, a hand size may be determined based on analysis of the 3D-image such as approximations of mean depth of the hand from a viewpoint or camera, projection parameters of the viewpoint or camera, a size of the hand in image pixels, or the like. As discussed, 2D- and/or 3D-image based invariant features may be generated. In some examples, 2D-image based invariant features may be based on a hand size determined using the 2D-image and, in other examples, 2D-image based invariant features may be based on a hand size determined using a 3D-image (if available). Similarly, in some examples, 3D-image based invariant features may be based on a hand size determined using the 3D-image and, in other examples, 3D-image based invariant features may be based on a hand size determined using a 2D-image (if available). For example, the hand size may be used to generate one or more invariant features as discussed herein. As discussed, in some examples, hand size may be determined based on an input image or images. In other examples, an a-priori known size of a hand may be used.

Furthermore, a point on the hand furthest from a contour of the hand may be determined Such a furthest from contour point may be determined using any suitable technique or techniques. For example, the furthest from contour point may be determined based on a distance transform of the hand image or imaging data. Such a furthest from contour point may be considered a hand center for processing as discussed herein.

Figure 5:
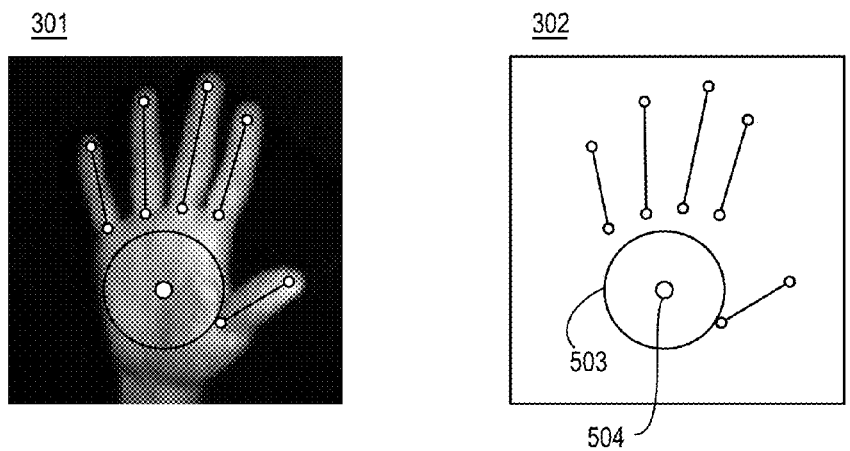
FIG. 5 illustrates an example hand center and an example distance transform radius for example hand image.

FIG. 5 illustrates an example hand center 504 and an example distance transform radius 503 for example hand image 301, arranged in accordance with at least some implementations of the present disclosure. As shown in FIG. 5, hand image 301 may include hand center 504 and distance transform radius 503. As discussed, distance transform radius 503 and hand center 504 may be determined using any suitable technique or techniques. For example, a distance transform may be applied to hand image 301 to generate a distance map or distance field of hand image 301. Such distance transform may be applied with any suitable distance or mapping metric such as Euclidian distance or Manhattan distance or the like. As discussed, hand center 504 may be associated with a furthest distance from a contour of the hand within hand image 301. For example, hand center 504 may be used to generate one or more invariant features as discussed herein.

Returning to FIG. 1, as discussed, at operation 104, 2D-image based invariant features, 3D-image based invariant features, and/or semantic invariant features may be extracted or determined and concatenated or the like to generate a feature vector for an area of interest.

As discussed, such invariant features may be scale invariant, rotation invariant, and position (e.g., translation) invariant. To determine such 2D-image based invariant features, a 2D coordinate system may be defined on a 2D hand image or other object image such that the origin of the 2D coordinate system is at a finger base point or area of interest base point or the like, the y-axis of the 2D coordinate system is aligned with a finger axis direction or other area of interest axis and points in a direction away from the finger base point or object of interest base poit, and the x-axis of the 2D coordinate system is perpendicular to the y-axis and points in a direction selected according to the right hand rule. Furthermore, the 2D coordinate system may be normalized (e.g., to achieve scale invariance) with respect to a hand size or object size determined as discussed herein. For example, the x-axis and y-axis may be scaled based on a hand size. Such a 2D coordinate system may be provided over the hand image in a finite grid containing N×M cells and properties may be determined for each of the N×M cells or for a subset of the N×M cells. The properties may be concatenated to generate at least a portion of a feature vector.

Figure 6:
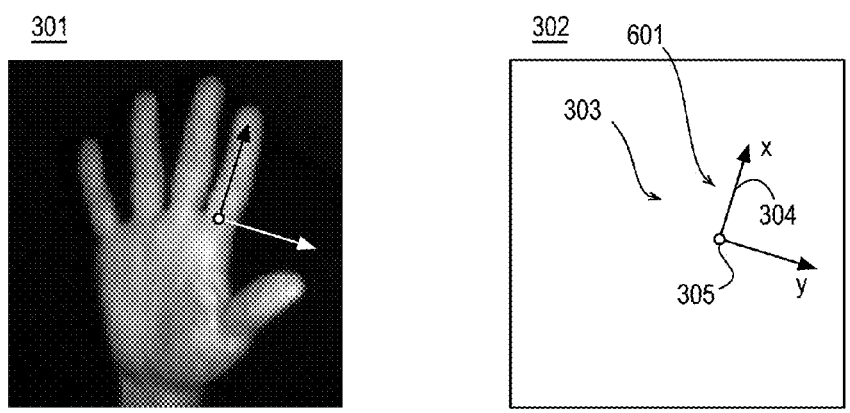
FIG. 6 illustrates an example 2D coordinate system for an index finger of example hand image.

FIG. 6 illustrates an example 2D coordinate system 601 for an index finger of example hand image 301, arranged in accordance with at least some implementations of the present disclosure. As shown in FIG. 6 and as discussed, area of interest 303 for the index finger (e.g., a suspected finger) of hand image 301 may include finger base point 305 and finger axis 304. Also as shown, 2D coordinate system 601 may be defined for the index finger of hand image 301 such that the origin of 2D coordinate system 601 is at finger base point 305, the y-axis of 2D coordinate system 601 is aligned with finger axis 304 and extends in a direction away from finger base point 305, and the x-axis of 2D coordinate system 601 is perpendicular to the y-axis of 2D coordinate system 601 and extends in a direction according to the right hand rule.

As shown, 2D coordinate system 601 may be provided for the index finger of hand image 301. A similar process may provide 2D coordinate systems for the other suspected fingers of hand image 301 (such as the illustrated little, ring, and middle fingers, and the illustrated thumb). Furthermore, such a 2D coordinate system may be provided on a 2D image or a 3D image. In the illustrated example, the 2D coordinate system is a Cartesian coordinate system. However, any suitable coordinate system may be used such as a polar coordinate system, or any arbitrary division of a 2D space.

Figure 7:
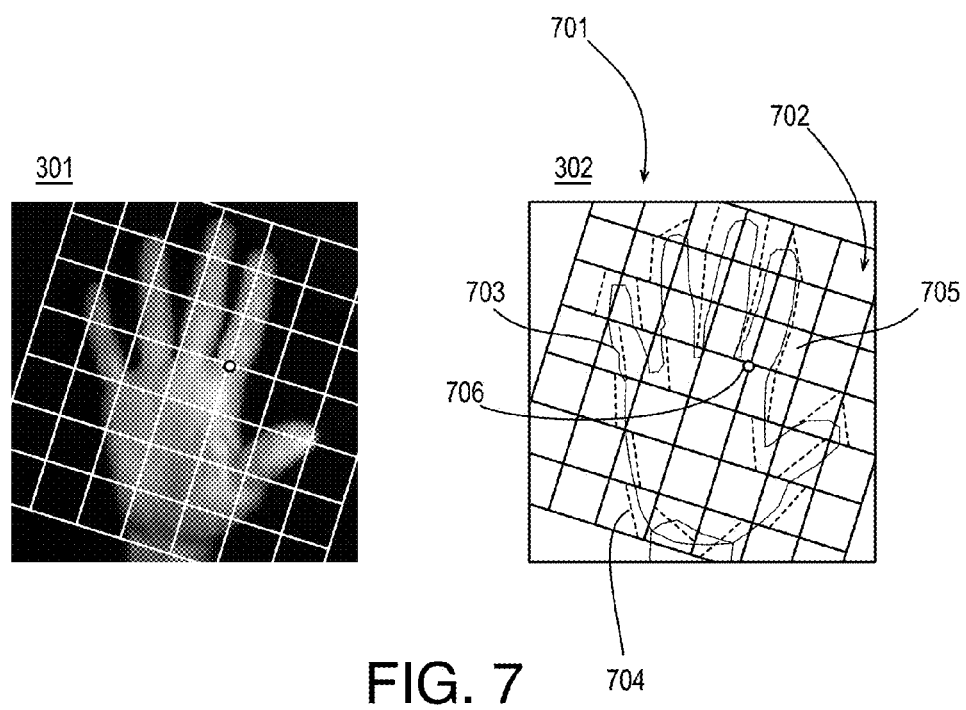
FIG. 7 illustrates an example grid of cells for an index finger of an example hand image.

FIG. 7 illustrates an example grid 701 of cells 702 for an index finger of example hand image 301, arranged in accordance with at least some implementations of the present disclosure. As shown in FIG. 7, grid 701 may include an origin 706 and cells 702 laid out according to the 2D coordinate system (e.g., 2D coordinate system 601) as discussed with respect to FIG. 6. Grid 701 may include any number of cells 702 (e.g., N×M cells as described herein) of any suitable size. As discussed, grid 701 may be a normalized grid based on the size of the hand in hand image 301. For example, grid 701 may be normalized and cells 702 may extend over the normalized range of [−1, 1] for the x-axis and y-axis of grid 701. Also, as discussed, grid 701 may implement a Cartesian coordinate system; however, any suitable coordinate system may be used.

In the example of FIG. 7, grid 701 partially extends over the boundary of hand image 301 and field 702. In other examples, grid 701 may be entirely contained within hand image 301 and field 702. In some examples, grid 701 may include partial cells and, in other examples, grid 701 may include only complete cells. For example, grid 701 may be a grid including a finite number of cells. In the example of FIG. 7, grid 701 includes 49 cells (e.g., in a 7×7 grid), however any number of cells may be implemented as discussed. Furthermore, grid 701 may be in any suitable orientation as defined by finger axis 304 (please refer to FIG. 6). As discussed, any suitable number and size of cells 702 may be implemented via grid 701. Furthermore, the hand represented via hand image 301 and field 302 may be any size or fill any portion of hand image 301 and field 302. In the example of FIG. 7, the hand fills the majority of hand image 301 and field 302. In other examples, the hand may fill a smaller portion (e.g., half or a quarter or the like) of hand image 301 and field 302. Furthermore, the hand may be in any position of hand image 301 and field 302 such as centered or in a quadrant of hand image 301 and field 302 or the like.

As discussed, multiple properties may be determined for each of cells 702 (or each of a subset of cells 702). For example, such properties may include a dominant orientation of gradients within a cell, an average magnitude of gradients within the cell, a depth difference between a mean depth of the cell and a mean depth of an origin cell of the grid of cells, or the like. For example, gradients 704 (illustrated via hatched lines for pertinent cells) may be determined based on image data of hand image 301. Furthermore, a hand contour 703 may be used to determine gradients and/or other characteristics as discussed herein (e.g., hand size, a hand blob, or the like). For example, hand contour 703 may include edges of the hand of hand image 301 determined via edge detection techniques or the like.

Gradients 704 may illustrate orientations of the dominant gradients within cells 702. Gradients 704 may be based on any suitable feature of hand image 301 such as an image gradient (e.g., color and/or intensity), a depth gradient, or a combination thereof. As discussed, cell properties may include dominant gradients within cells 702 such as gradients 704. Furthermore, the cell properties may include an average magnitude of gradients within cells 702. Also, the cell properties may include depth information for cells 702 (e.g., a mean depth, maximum depth, minimum depth, weighted average or the like) and/or a depth comparison between cells 702 and an origin cell 705. For example, origin cell 705 may include a cell adjacent to origin 706 of grid 701. In other examples, origin 706 may be placed within or at a center of origin cell 705. The depth comparison between cells 702 and origin cell 705 may include a depth difference between a mean depth of cells and a mean depth of origin cell 705, for example. Although discussed with respect to mean depth, maximum depth, minimum depth, or weighted average, other depth characteristics may be used.

As discussed, such cell properties (e.g., a dominant orientation of gradients within a cell, an average magnitude of gradients within the cell, a depth difference between a mean depth of the cell and a mean depth of an origin cell of the grid of cells, or the like) may be determined for each of cells 702 or at least a subset or portion of cells 702. Such cell properties may be concatenated or otherwise combined to form at least a part of a feature vector as discussed herein. For example, if K properties are determined for N×M cells 702 of grid 701, N×M×K properties may be determined and concatenated to form a N×M×K feature vector or portion of a feature vector, such features may be combined with other features such as semantic features to form a final feature vector for analysis). In some examples, all such N×M×K features may be used to form a feature vector. In other examples, features of a subset of cells 702 (e.g., a subset of the N×M cells) may be used to form a feature vector. For example, the subset of cells may be in a predetermined pattern (e.g., a checkerboard or the like) or the subset of cells may include randomly chosen cells or the like. Such cell properties may be determined for a 2D image or a 3D image or both. As discussed, a 2D Cartesian grid of cells may be provided. In other examples, an image space may be divided into a polar coordinate system based grid of cells or any arbitrary grid of cells. Furthermore, 3D images or image spaces may be processed using 2D coordinate systems or 3D coordinate systems to generate cell properties and feature vectors or portions thereof.

Also as discussed, such processing (e.g., grid generation, determination of cell properties, and generation of a feature vector or portion thereof) may be repeated for any number of suspected fingers of hand image 301 and for any number of hand images.

Furthermore, as discussed, semantic features may be determined or generated for an area of interest (e.g. a suspected finger) of hand image 301. Such semantic features may be invariant features as discussed herein and they may be combined with other invariant features to generate a feature vector for evaluation via a machine learning classifier. Such semantic features may include a normalized finger length, a normalized finger width, a normalized distance from a finger base point to a center of a hand, a palm radius, a number of detected fingers in the hand image, a number of fingers pointing in the same direction as the finger, a number of fingers pointing in the opposite direction of the finger, a number of fingers perpendicular to the finger, or the like. Such features may be determined based on one or more of the properties of hand image 301 determined as discussed herein and additional properties as needed.

For example, with reference to FIG. 4, a normalized finger length may be determined for areas of interest 403 based on a length of finger axes 404 (e.g., a length for a single line segment or a sum of lengths for multiple line segments) normalized by (e.g., divided by) the hand size of the hand of hand image 301 or the like. Similarly, a normalized finger width for areas of interest 403 may be determined as finger widths for areas of interest 403 (e.g., determined via edge detection techniques or the like and including a mean width, a minimum width, a maximum width an average width, a representative width of the suspected finger, or the like) normalized by (e.g., divided by) the hand size of the hand of hand image 301 or the like. Furthermore, a normalized distance from a finger base point to a center of a hand for areas of interest 403 may be determined as distances from finger base points 405 to hand center 504 (please refer to FIG. 5) normalized by (e.g., divided by) the hand size of the hand of hand image 301 or the like. In some examples, a palm radius may be used as a semantic feature such that the palm radius may be determined via distance transform techniques as discussed herein. For example, the palm radius may be determined as distance transform radius 503.

Also as discussed, a number of detected fingers in the hand image, a number of fingers pointing in the same direction as the finger, a number of fingers pointing in the opposite direction of the finger, and/or a number of fingers perpendicular to the finger within hand image 301 may be provided as semantic features. For example, the number of detected fingers in the hand image may correspond to the number of areas of interest 403 within hand image 301. The number of fingers pointing in the same direction as the finger may be determined based on a slope or angle and direction of finger axes 404. For example, for a subject suspected finger, a slope or angle and direction of the associated finger axis may be determined. The number of fingers pointing in the same direction may then be determined based on a comparison of the slope or angle and direction of other finger axes to the subject finger axis such that if the other finger axis pointing in the same direction and the slope or angle is the same as or within a threshold of the subject finger axis, the finger is determined to be pointed in the same direction as the subject finger. Similarly, the number of fingers pointing in the opposite direction of the finger may be determined based on a slope or angle and direction of finger axes 404. For example, for a subject suspected finger, a slope or angle and direction of the associated finger axis may be determined. The number of fingers pointing in the opposite direction may then be determined based on a comparison of the slope or angle and direction of other finger axes to the subject finger axis such that if the other finger axis pointing in the opposite direction and the slope or angle is the same as or within a threshold of the subject finger axis, the finger is determined to be pointed in the opposite direction of the subject finger.

Furthermore, the number of number of fingers perpendicular to the finger within hand image 301 may be determined based on finger axes 404. For example, for a subject suspected finger, a slope or angle and direction of the associated finger axis may be determined. The number of fingers perpendicular to the subject finger may then be determined based on a comparison of the slope or angle and direction of other finger axes to the subject finger axis such that if the other finger axis at a 90 degree angle with respect to the subject finger axis or within a threshold of the 90 degree angle, the finger is determined to be perpendicular to the subject finger. Furthermore, for such perpendicular fingers, a relative positioning between the subject finger axis and the perpendicular finger axis may be provided as a semantic feature as discussed herein. For example, the perpendicular finger axis may be determined to be perpendicular and clockwise from the subject finger axis or perpendicular and counterclockwise from the subject finger axis.

Returning to FIG. 1, at operation 104, such invariant features (e.g., 2D-image based, 3D-image based, and/or semantic based invariant features) may be concatenated or otherwise combined to generate a feature vector including the invariant features. In some examples, the generated feature vector may include only invariant features. In other examples, the feature vector may include invariant features as discussed herein and other features. Furthermore, a subset of invariant features or a subset of invariant features and other features may be used to generate a feature vector. Such subsets of invariant features may be determined using any suitable technique or techniques such as features selection techniques or methods.

Although discussed herein in detail with respect to invariant features associated with hand images, as discussed, the techniques and systems discussed herein may be used to label any suitable object components such as body parts or face parts, or the like. In particular, scale, rotation, and position invariant features may be generated for any areas of interest of any suitable object and combined to form a feature vector, which may be provided to a machine learning classifier for the generation of an area of interest label.

For example, a grid of cells may be applied to an image of a body such that the origin is at a body part base point and the y-axis extends along the body part axis in analogy to the discussed finger part base point and finger axis. Furthermore, properties such as gradient based properties as discussed may be determined for the cells (or a subset thereof) of the grid and the properties may be concatenated to form a feature vector. Furthermore, semantic features may be defined for body parts such as a normalized body part length, a normalized body part width, a normalized distance to a body center point, a number of detected body parts, a number of body parts pointing in the same direction as the subject body part (e.g., the body part currently being labeled), a number of body parts pointing in the opposite direction of the subject body part, or a number of body parts perpendicular to the subject body part or the like. The semantic features may also be provided in the feature vector a discussed herein.

In another example, a grid of cells may be applied to an image of a face such that the origin is at a face part base point and the y-axis extends along a face part axis in analogy to the discussed finger part base point and finger axis. Furthermore, properties such as gradient based properties as discussed may be determined for the cells (or a subset thereof) of the grid and the properties may be concatenated to form a feature vector. Furthermore, semantic features may be defined for face parts such as a normalized face part length, a normalized face part width, a normalized distance to a face center point, a number of detected face parts, a number of face parts pointing in the same direction as the subject face part (e.g., the face part currently being labeled), a number of face parts pointing in the opposite direction of the subject face part, or a number of face parts perpendicular to the subject face part or the like. The semantic features may also be provided in the feature vector a discussed herein.

As shown, process 100 may continue from operation 104 at operation 105, "Apply Machine Learning Classifier to Determine Component Label", where a machine learning classifier may be applied to the feature vector to determine a component label (e.g., a hand part label, a body part label, a face part label, or the like) for the area of interest based on the feature vector, and at ending operation 106, where process 100 may end. The machine learning classifier may include any suitable machine learning classifier implemented using any suitable technique or techniques. In some examples, the machine learning classifier may be a supervised learning classifier that was pretrained as is discussed further herein with respect to FIG. 8. In some examples, the machine learning classifier may generate a classifier that provides a hand part label. Any suitable machine learning classifier or combination of machine learning classifiers (e.g., a combined classifier) may be implemented. For example, the machine learning classifier may include one or more of a K-nearest neighbor classifier, a classification and regression tree (CART) classifier, a decision tree learning classifier, a random forest learning classifier, an adaptive boosting classifier such as the Adaboost classifier, a cascading classifier such as the Cascaded Adaboost classifier, a gradient boosting tree classifier, a support vector machine (SVM), a kernalized SVM, a linear classifier, a logistic regression classifier, a naïve Bayes classifier, a generalized likelihood ratio test (GLRT) classifier (e.g., with plug-in parametric or non-parametric class conditional density estimation), a radial base function (RBF) classifier, a multilayer perceptron classifier, a neural network classifier, a Bayesian network classifier, or the like. For example, a combined classifier may include two or more of the discussed classifiers or other classifiers.

A component label determined via operation 105 may include any suitable label such as a finger descriptor in the hand labeling context (e.g., a thumb, index finger, middle finger, ring finger, or little finger descriptor), a numerical value (e.g., 1 indicating thumb, 2 indicating index finger, 3 indicating middle finger, 4 indicating ring finger, and 5 indicating little finger), a face part descriptor in the face labeling context (e.g., a left eye, a right eye, a nose, a mouth, or the like) or a numerical value associated with such face parts, or a body part descriptor in the body labeling context (e.g., a left arm, a right arm, a left leg, a right leg, a torso, a head, or the like) or a numerical value associated with such body parts or the like. Furthermore, in addition to a component label, a confidence value or probability or the like associated with the hand part label may be provided. Also, although discussed with respect to a component label being provided for each area of interest (e.g., suspected finger), in some examples, two or more potential or candidate component labels may be provided for an area of interest. Furthermore, in such examples the candidate component labels may also be associated with confidence values or probabilities or the like for each hand part label.

For example, component labels (and any additional information such as probabilities) may be provided for any number of areas of interest (e.g., hand labels for suspected fingers in the hand labeling context) within an image and any number of objects (e.g., hands) within an input image. The component labels may be used in a variety of contexts such as image recognition, gesture recognition or tracking, and the like. For example, hand part labels may be provided to other modules within a hand gesture recognition module (as discussed with respect to FIG. 9) to track hand parts, identify gestures, correct such labels (as needed), or the like. For example, recognized gestures may be translated into commands for consumer electronic devices. Furthermore, such tracking of hand part labels and other data over time may provide a time based perspective to object detection, object recognition, object labeling, and gesture recognition processing.

Furthermore, for areas of interest portions such as finger axes, finger base points, and finger tip points, such portions or elements may also be labeled based on the determined hand part labels. For example, if the hand part label for area of interest 303 (please refer to FIG. 3) is determined to be index finger, then finger axis 304 may be labeled as an index finger axis, finger base point 305 may be labeled as an index finger base point, and the finger tip point of finger tip points 406 associated with the index finger (please refer to FIG. 4) may be labeled as an index finger tip point. Such labeled elements may be tracked or processed across images or image frames for example.

As discussed with respect to operation 105, a machine learning classifier may be applied to feature vectors to determine component labels such as hand part labels. In some examples, the machine learning classifier may be pretrained offline (e.g., in a training phase), stored in a database structure and implemented via a device (e.g., in an implementation phase) as discussed with respect to operation 105 and device 900 of FIG. 9. To implement such a machine learning classifier, a database of labeled training instances may be used to train the machine learning classifier.

Figure 8:
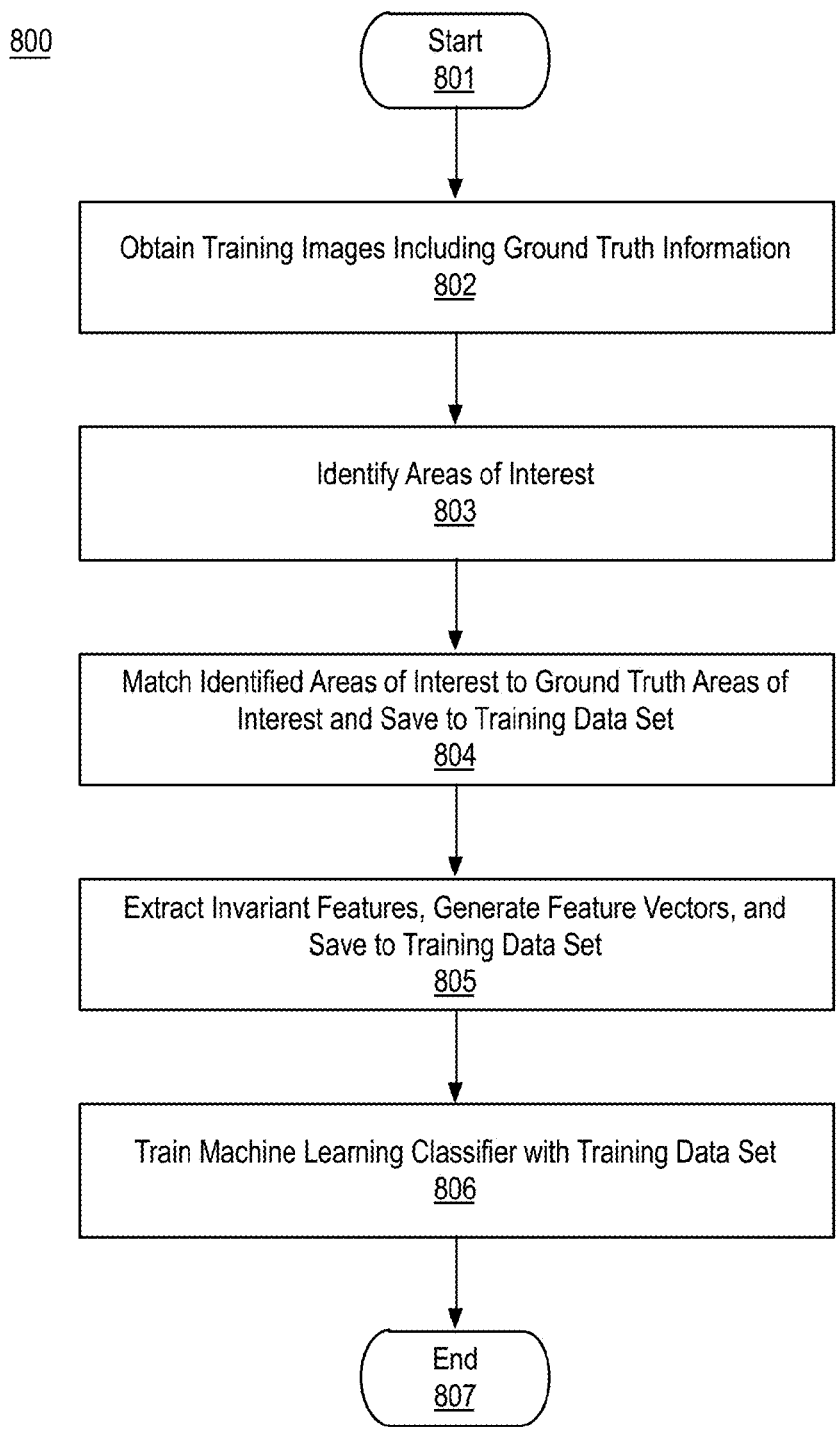
FIG. 8 is a flow diagram illustrating an example process for training a machine learning classifier for labeling areas of an image.

FIG. 8 is a flow diagram illustrating an example process 800 for training a machine learning classifier for labeling areas of an image, arranged in accordance with at least some implementations of the present disclosure. Process 800 may include one or more operations 801-807 as illustrated in FIG. 8. Process 800 may be performed by a device (e.g., an offline device as discussed herein) to generated a machine learning classifier.

As shown, process 800 may begin from start operation 801 at operation 802, "Obtain Training Images Including Ground Truth Information", where training images including ground truth information may be generated or obtained. For example, the training images may include one or more images of hands or other objects (e.g., faces or bodies or the like) and ground truth information labeled or marked therein such as actual anatomic points of the hands (finger tip points, finger base points, finger joint points, finger axes, etc.) or points pertinent to the other objects, and actual hand labels or component labels for areas of interest (e.g., finger types). The training images may include actual images of objects, synthetically generated images, or a combination thereof. As discussed, in some examples, finger tip points, finger base points, and finger axes, and the like may provide or represent an area of interest (e.g., suspected finger) as discussed herein. Any number of training images may be used with greater numbers of training images providing increased accuracy. For example, hundreds, thousands, tens of thousands, hundreds of thousands, millions, or more training images may be used.

Process 800 may continue at operation 803, "Identify Areas of Interest", where areas of interest may be identified within hand images of the training images using the area of interest identification techniques discussed herein. For example, the areas of interest may include, in the context of labeling hand parts, identified finger axes, finger base points, and/or finger tip points as described. In other contexts (e.g., face labeling, body part labeling, or other object labeling), the areas of interest ma include, for example, face part axes, face part base points, body part axes, body part base points, or the like. Such areas of interest may be identified using any suitable technique or techniques such as those discussed herein with respect to operation 103 and FIGS. 3 and 4 and such areas of interest may include detected or identified areas of interest (e.g., not ground truth areas of interest).

Process 800 may continue at operation 804, "Match Identified Areas of Interest to Ground Truth Areas of Interest and Save to Training Data Set", where areas of interest identified at operation 803 may be matched to ground truth areas of interest within the input images as discussed at operation 802 and the results may be saved to a training data set. For example, the identified areas of interest may be compared to the ground truth areas of interest to correct the identified areas of interest and train a machine learning classifier as discussed at operation 806.

Process 800 may continue at operation 805, "Extract Invariant Features, Generate Feature Vectors, and Save to Training Data Set", where invariant features may be extracted or determined, feature vectors may be generated based on the determined invariant features, and the results may be saved to the training data set. For example, the generated feature vectors may be matched to ground truth hand labels to provide training information for the machine learning classifier as discussed at operation 806.

Process 800 may continue at operation 806, "Train Machine Learning Classifier with Training Data Set", where the machine learning classifier may be trained, and at ending operation 807, where process 800 may end. The machine learning classifier may be trained using any suitable technique or techniques such as supervised learning techniques. Furthermore, the machine learning classifier may be any suitable classifier or combination of classifiers such as those discussed with respect to operation 105. In some examples, training the machine learning classifier may include training the machine learning classifier to or based on the training data set (e.g., including identified areas of interest, ground truth areas of interest, determined feature vectors, and/or ground truth hand part labels) to generate a machine learning classifier able to label areas of interest (e.g., suspected fingers) with high accuracy.

As discussed herein the described techniques and systems may be used to label (e.g., provide a component label) to any suitable object components such as parts of a hand, body parts, face parts, object parts, or the like. In particular, scale, rotation, and position invariant features may be generated for any areas of interest of any suitable object and combined to form a feature vector, which may be provided to a machine learning classifier for the generation of an area of interest label. In some examples, the component labels may include hand part labels. Furthermore, such component labels may be used to perform gesture recognition.

Figure 9:
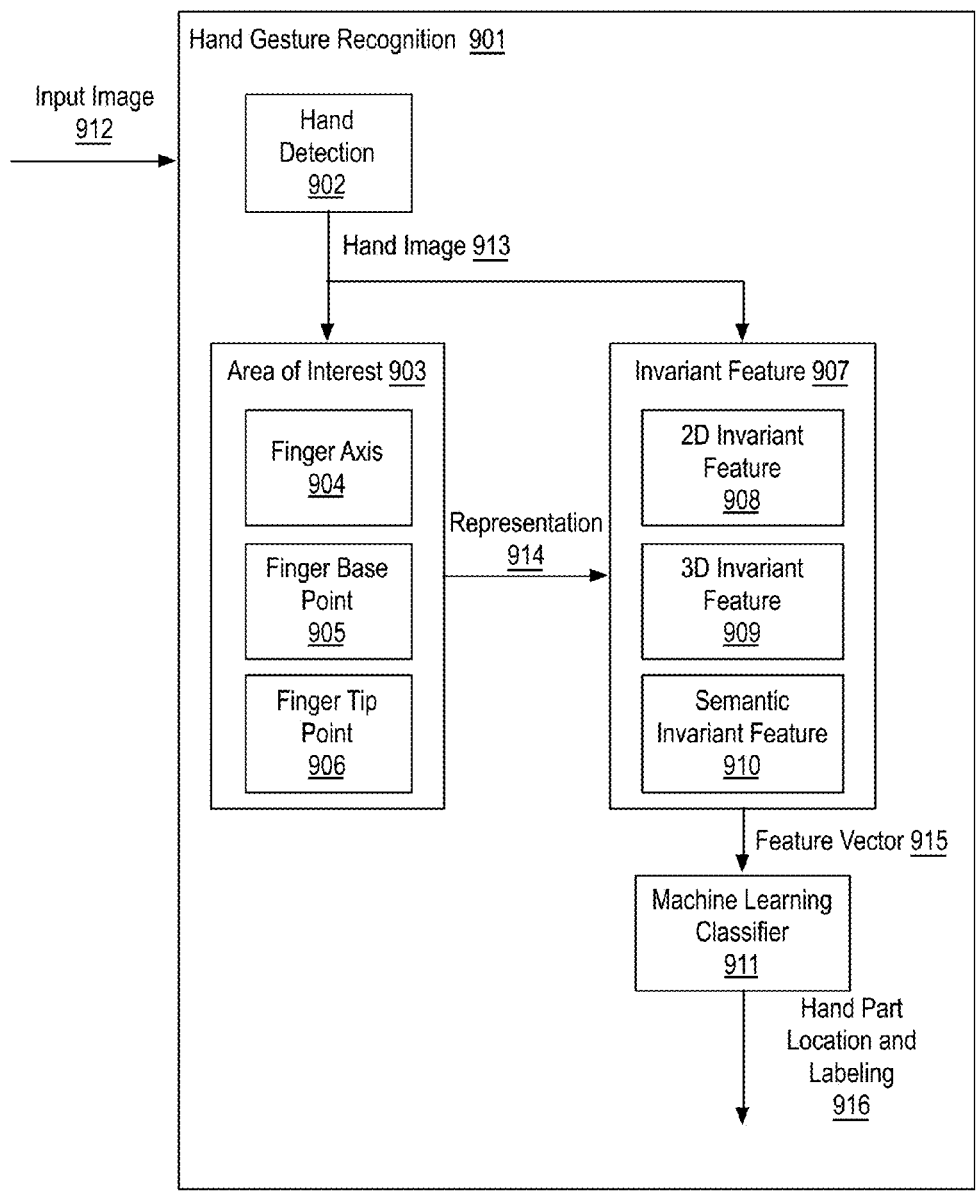
FIG. 9 is a block diagram illustrating an example device including an example hand gesture recognition module.

FIG. 9 is a block diagram illustrating an example device 900 including an example hand gesture recognition module 901, arranged in accordance with at least some implementations of the present disclosure. As shown in FIG. 9 hand gesture recognition module 901 may be implemented as a portion, part, or component of device 900. Device 900 may include any suitable device such as a smartphone, a tablet, a computer, a handheld gaming device, a laptop, an ultrabook, a touch display device, a television, a smart television, a gaming console, a server, or the like. For example, device 900 may include a camera to attain input images as discussed herein. The camera may include one or more of a standard 2D camera, a 3D camera, an IR camera, a depth camera, a light field camera, or the like. In some examples, device 900 may be a server implemented as a cloud computing resource.

Also as shown, hand gesture recognition module 901 may include a hand detection module 902, an area of interest module 903, an invariant feature module 907, and a machine learning classifier module 911. Furthermore, area of interest module 903 may include a finger axis module 904, a finger base point module 905, and a finger tip point module 906 and invariant feature module 907 may include a 2D invariant feature module 908, a 3D invariant feature module 909, and a semantic invariant feature module 910. Hand gesture recognition module 901 may receive an input image 912 or a portion thereof. Input image 912 may be received from a camera or memory of device 900 or the like. In some examples, input image 912 may be received at device from a remote device and provided to hand gesture recognition module 901. Input image 912 may include any imaging data or image file or the like such as a 2D input image, a 3D input image, an infrared (IR) image, a depth image, a grayscale image, or a color image such as a red-green-blue (RGB) color model image, or the like, or combinations thereof.

In some examples, hand gesture recognition module 901 may include a hand detection module 902, which may receive input image 912 and detect a hand image 913 (e.g., an image of a hand or including a representation of a hand). Hand detection module 902 may determine hand image 913 using any suitable technique or techniques such as object detection techniques including image preprocessing, feature extraction, and feature detection techniques or the like. In some examples, input image 912 may be a hand image in which case, hand detection module 902 may be bypassed. Hand image 913 may include any suitable image or imaging data such as those discussed with respect to input image 912. Hand detection module 902 may provide hand image 913 to area of interest module 903, invariant feature module, and/or to a memory of device 900 (not shown).

Area of interest module 903 may receive hand image 913 from hand detection module 902 or from memory and area of interest module 903 may generate a representation 914 of an area of interest (e.g., a suspected finger) within hand image 913. Representation 914 may include any suitable data representative of an area of interest such as a finger axis, a finger base point, a finger tip point, a finger joint point, or the like. For example, finger base points and finger tip points may be represented as coordinates within hand image 913 and finger axes may be represented as multiple points within hand image 913. As shown, in some examples, area of interest module 903 may include a finger axis module 904 to generate a finger axis, a finger base point module 905 to generate a finger base point, and a finger tip point module 906 to generate a finger tip point for the area of interest. Area of interest module 903 may also include or access image processing modules or the like to support the generation of representation 914 such as edge detection modules, blob generation modules, image preprocessing or filtering modules, or the like. Area of interest module 903 and/or finger axis module 904, finger base point module 905, and finger tip point module 906 may generate representation 914 using any suitable technique or techniques such as those discussed herein with respect to process 100. Area of interest module 903 may provide representation 914 to invariant feature module 907 and/or to a memory of device 900.

Invariant feature module 907 may receive representation 914 from area of interest module 903 or memory and hand image 913 from hand detection module 902 or memory, and invariant feature module 907 may generate a feature vector 915. Feature vector 915 may include any suitable vector or data including any number of invariant features (e.g., 2D- or 3D-image based or semantic invariant features) such as properties associated with cells of a grid of cells overlaid on hand image 913 as discussed herein. As shown, in some examples, invariant feature module 907 may include 2D invariant feature module 908 to generate 2D-image based invariant features, 3D invariant feature module 909 to generate 3D-image based invariant features, and semantic invariant feature module 910 to generate semantic invariant features. Invariant feature module 907 may also include or access image processing modules or the like to support the generation of feature vector 915 such as edge detection modules, blob generation modules, image preprocessing or filtering modules, gradient generation modules, feature comparison modules, a concatenation module, or the like. Invariant feature module 907 and/or 2D invariant feature module 908, 3D invariant feature module 909, and a semantic invariant feature module 910 may generate feature vector 915 any suitable technique or techniques such as those discussed herein with respect to process 100. Invariant feature module 907 may provide feature vector 915 to machine learning classifier module 911 and/or to a memory of device 900.

Machine learning classifier module 911 may receive feature vector 915 from invariant feature module 907 or memory and machine learning classifier module 911 may generate a hand part location and labeling 916 based on the feature vector and associated with the area of interest represented by representation 914. Hand part location and labeling 916 may include an suitable label, indicator, or data that may label a hand part, area of interest, or the like such as a finger descriptor (e.g., a thumb, index finger, middle finger, ring finger, or little finger descriptor), a numerical value (e.g., 1 indicating thumb, 2 indicating index finger, 3 indicating middle finger, 4 indicating ring finger, and 5 indicating little finger), or the like. Machine learning classifier module 911 may generate hand part location and labeling 916 using any suitable technique or techniques such as those discussed with respect to process 100. For example, machine learning classifier module 911 may include a pre-trained machine learning classifier trained as discussed with respect to process 800 or the like. In some examples, machine learning classifier module 911 may implement one or more of a K-nearest neighbor classifier, a CART classifier, a decision tree learning classifier, a random forest learning classifier, an adaptive boosting classifier such as the Adaboost classifier, a cascading classifier such as the Cascaded Adaboost classifier, a gradient boosting tree classifier, an SVM, a kernalized SVM, a linear classifier, a logistic regression classifier, a naïve Bayes classifier, a GLRT classifier, an RBF classifier, a multilayer perceptron classifier, a neural network classifier, a Bayesian network classifier, or the like, or a combination thereof (e.g., a combined classifier). Machine learning classifier module 911 may provide hand part location and labeling 916 to another module of device 900 and/or to a memory of device 900.

Hand gesture recognition module 901 or other modules or circuitry of device 900 may use hand part location and labeling 916 in a variety of contexts such as object recognition, object tracking, gesture recognition, or the like. For example, labeled hand parts may be tracked over multiple sequential images to track a hand and/or identify a gesture or the like. The operations discussed with respect to hand gesture recognition module 901 may be repeated any number of times for other areas of interest (e.g., suspected fingers) within hand image 913, for any number of hand images, for any number of input images, or the like. Such processing may be performed in serial or in parallel or a combination thereof. Area of interest module 903, invariant feature module 907, and machine learning classifier module 911 may be implemented via any suitable logic circuitry and/or memory resources. Such modules may provide for relatively low computation complexity and a relatively small memory footprint (e.g., particularly for machine learning classifier module 911) for attaining accurate hand part labels such as hand part label 916.

Although discussed herein in detail with respect to hand part labels and hand images, the techniques and systems discussed herein may be used to label any suitable object components such as other body parts, portions or areas of a face, or the like. In particular, scale, rotation, and position invariant features may be generated for any areas of interest of any suitable object and combined to form a feature vector, which may be provided to a machine learning classifier for the generation of an area of interest label.

Figure 10:
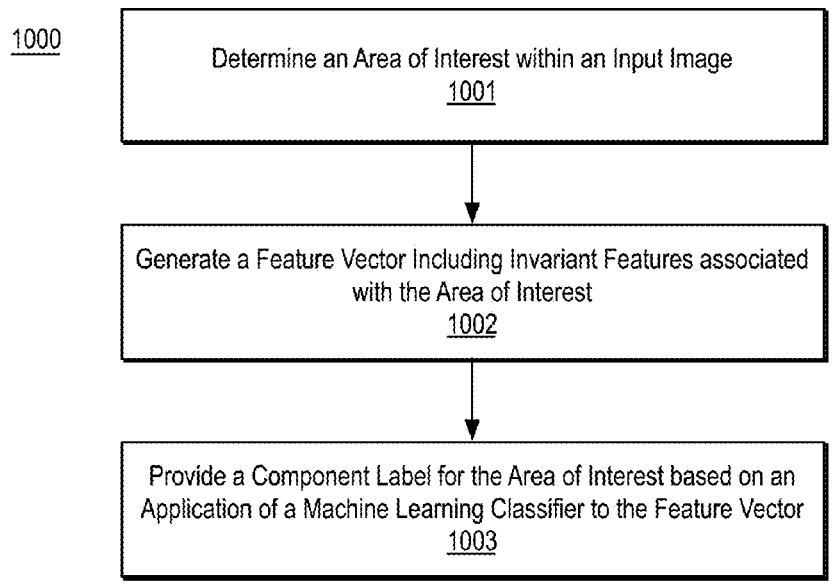
FIG. 10 is a flow diagram illustrating an example process for labeling areas of an input image.

FIG. 10 is a flow diagram illustrating an example process 1000 for labeling areas of an input image, arranged in accordance with at least some implementations of the present disclosure. Process 1000 may include one or more operations 1001-1003 as illustrated in FIG. 10. Process 1000 may form at least part of an area labeling, object detection, object recognition, or gesture recognition process. By way of non-limiting example, process 1000 may form at least part of an area labeling process for device 900 as discussed herein. Furthermore, process 1000 will be described herein with reference to system 1100 of FIG. 11.

Figure 11:
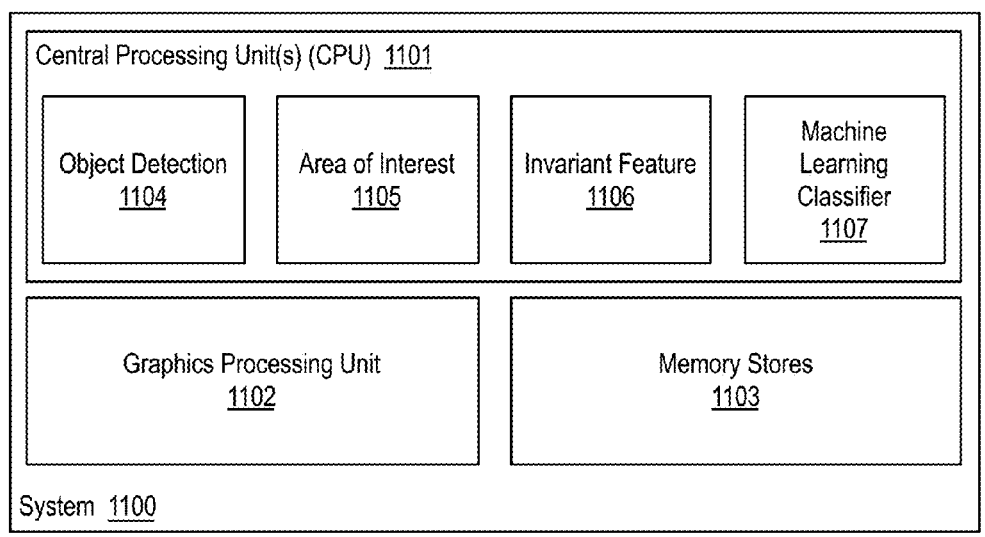
FIG. 11 is an illustrative diagram of an example system for providing labels to areas of an input image.

FIG. 11 is an illustrative diagram of an example system 1100 for providing labels to areas of an input image, arranged in accordance with at least some implementations of the present disclosure. As shown in FIG. 11, system 1100 may include one or more central processing units (CPU) 1101, a graphics processing unit (GPU) 1102, and memory stores 1103. CPU 1101, GPU, and memory stores 1103 may be communicatively coupled via a bus or the like. Also as shown, CPU 1101 may include an object detection module 1104, an area of interest module 1105, an invariant feature module 1106, and a machine learning classifier module 1107. In some examples, area of interest module 1105 may include finger axis module 904, finger base point module 905, and finger tip point module 906 and invariant feature module 1106 may include 2D invariant feature module 908, 3D invariant feature module 909, and semantic invariant feature module 910 (please refer to FIG. 9). In the example of system 1100, memory stores 1103 may store image data and/or image processing data such as captured images, input images, images of hands, area of interest data, representation data associated with areas of interest, axes data, base point data, tip point data, grid data, cell properties data, gradient data, invariant features, feature vectors, machine learning weights or other data, component label data, and/or any other data as discussed herein.

As shown, in some examples, object detection module 1104, area of interest module 1105, invariant feature module 1106, and machine learning classifier module 1107 may be implemented via central processing units 1101. In other examples, one or more of or portions of object detection module 1104, area of interest module 1105, invariant feature module 1106, and machine learning classifier module 1107 may be implemented via graphics processing unit 1102. In yet other examples, one or more of or portions of object detection module 1104, area of interest module 1105, invariant feature module 1106, and machine learning classifier module 1107 may be implemented via an imaging pipeline and/or an imaging processing unit. Furthermore, system 1100 may include a camera such as a standard camera, an IR camera, a depth camera, and/or a 3D camera to obtain an input image or images.

Graphics processing unit 1102 may include any number and type of graphics processing units that may provide the operations as discussed herein. Such operations may be implemented via software or hardware or a combination thereof. For example, graphics processing unit 1102 may include circuitry dedicated to manipulate images obtained from memory stores 1103. Central processing units 1101 may include any number and type of processing units or modules that may provide control and other high level functions for system 1100 and/or provide any operations as discussed herein. Memory stores 1103 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1103 may be implemented by cache memory. In an embodiment, one or more of or portions of object detection module 1104, area of interest module 1105, invariant feature module 1106, and machine learning classifier module 1107 (or other modules discussed herein) may be implemented via an execution unit (EU) of graphics processing unit 1102. The EU may include, for example, programmable logic or circuitry such as a logic core or cores that may provide a wide array of programmable logic functions. In an embodiment, one or more of or portions of object detection module 1104, area of interest module 1105, invariant feature module 1106, and machine learning classifier module 1107 (or other modules discussed herein) may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 10, process 1000 may begin at operation 1001, "Determine an Area of Interest within an Input Image", where an area of interest may be determined for an object. For example, the area of interest may be determined within an image of a hand, an image of a face, an image of a body, or the like. The area of interest may be determined, for example, via area of interest module 1105 as implemented via central processing units 1101. As discussed herein, the area of interest may include a representation of a suspected component such as a finger, face part, body part, or a portion of a suspected finger, face part, body part within the input image. The representation may, for example, include one or more of a component axis, component base point, or a component tip point, or the like The image of the object (e.g., hand, face, body, or the like) may be a portion of an input image for example such that the image of the object was determined based on an object detection performed on the input image. For example, object detection may be performed on an input image to determine the image of the object via object detection module 1104 as implemented via central processing units 1101. The input image and/or the image of the object may include any imaging data or image files as discussed herein such as a 2D image, a 3D image, a depth image, or an infrared image.

Processing may continue at operation 1002, "Generate a Feature Vector Including Invariant Features associated with the Area of Interest", where a feature vector including multiple invariant features associated with the area of interest may be generated. For example, a feature vector including invariant features may be generated via invariant feature module 1106 as implemented via central processing units 1101. Such invariant features may be scale invariant, rotation invariant, and position invariant features as discussed herein. For example, the invariant features may include 2D-image based invariant features, 3D-image based invariant features, or semantic invariant features as discussed herein. In the context of hand part labeling, the semantic features may include one or more of a normalized finger length, a normalized finger width, a normalized distance from a finger base point to a center of a hand, a palm radius, a number of detected fingers in the hand image, a number of fingers pointing in the same direction as the finger, a number of fingers pointing in the opposite direction of the finger, a number of fingers perpendicular to the finger, or the like. In the context of body part labeling, the semantic features may include one or more of a normalized body part length, a normalized body part width, a normalized distance to a body center point, a number of detected body parts, a number of body parts pointing in the same direction as the subject body part (e.g., the body part currently being labeled), a number of body parts pointing in the opposite direction of the subject body part, or a number of body parts perpendicular to the subject body part, or the like. In the context of face part labeling, the semantic features may include one or more of a normalized face part length, a normalized face part width, a normalized distance to a face center point, a number of detected face parts, a number of face parts pointing in the same direction as the subject face part (e.g., the face part currently being labeled), a number of face parts pointing in the opposite direction of the subject face part, or a number of face parts perpendicular to the subject face part, or the like.

In some examples, generating one or more of the invariant features may include providing a normalized grid of cells having an axis aligned with a component axis and an origin point at a component base point, determining one or more properties for each cell of the grid of cells (or a subset of the cells of the grid), and concatenating or otherwise combining the properties to generate the feature vector or a portion of the feature vector. For example, the properties may include one or more of a dominant orientation of gradients within a cell, an average magnitude of gradients within the cell, or a depth difference between a mean depth of the cell and a mean depth of an origin cell of the grid of cells. For example, such techniques may be performed via invariant feature module 1106 as implemented via central processing units 1101. Any combination of the discussed invariant features may be implemented and combined to form the feature vector.

Processing may continue at operation 1003, "Provide a Component Label for the Area of Interest based on an Application of a Machine Learning Classifier to the Feature Vector", where a hand part label for the area of interest may be provided based on an application of a machine learning classifier to the feature vector. For example, machine learning classifier module 1107 as implemented via central processing units 1101 may apply the machine learning classifier to provide the hand part label. The machine learning classifier may include any suitable machine learning classifier as discussed herein such as a K-nearest neighbor classifier, a classification and regression tree classifier, a decision tree learning classifier, a random forest learning classifier, an adaptive boosting classifier, a cascading classifier, a gradient boosting tree classifier, a support vector machine, a linear classifier, a logistic regression classifier, a naïve Bayes classifier, a generalized likelihood ratio test classifier, a radial base function classifier, a multilayer perceptron classifier, a neural network classifier, a Bayesian network classifier, or a combination classifier.

As discussed, the machine learning classifier may be pre-trained. For example, the machine learning classifier may be pre-trained by identifying one or more second areas of interest within a training input image, matching the identified second areas of interest to true areas of interest within the input training image, generating one or more second feature vectors associated with the one or more second areas of interest to provide a training data set comprising the one or more second feature vectors and true labels for the second feature vectors, and training the machine learning classifier based on the training data set. Such operations may be performed via central processing units 1101 such that the machine learning classifier is generated via system 1100 or via a central processing unit of a remote device such that the machine learning classifier is generated via a remote system, stored via a suitable data structure, and implemented via central processing units 1101 (e.g., via machine learning classifier module 1107 as implemented via central processing units 1101).

Process 1000 may be repeated any number of times for any number of images of an object or input images or the like. As discussed process 1000 may provide for automatic selection of a component label for areas of interest within an image of an object. Such component labels may be used in a variety of contexts via system 1100 as discussed herein such as object detection, object tracking, gesture recognition, motion recognition, or the like.

Various components of the systems described herein may be implemented in software, firmware, and/or hardware and/or any combination thereof. For example, various components of device 900, device 1300, system 1100, or system 1200 may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures. For example, the systems discussed herein may include additional components such as communications modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of device 900, device 1300, system 1100, or system 1200, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 12:
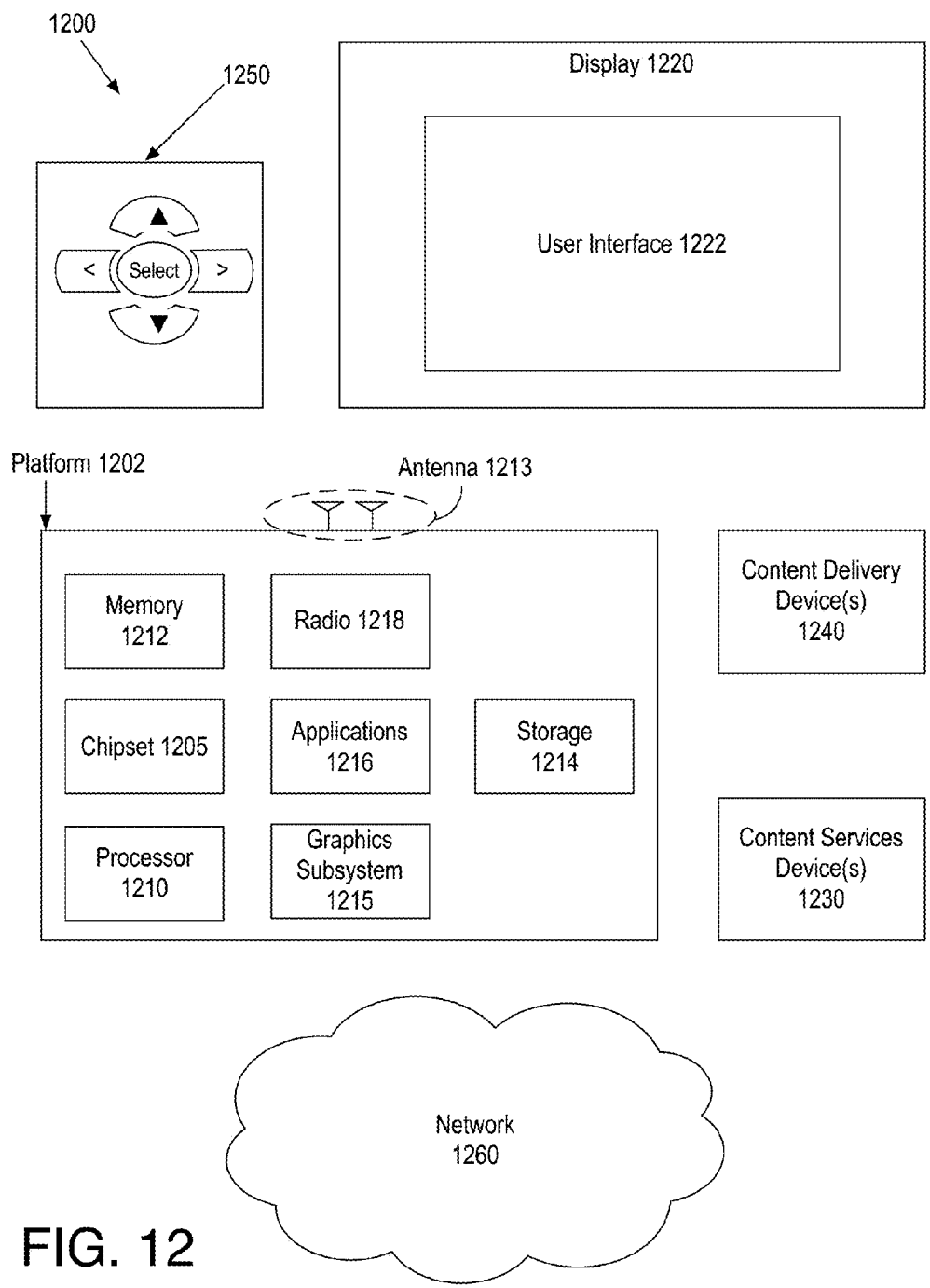
FIG. 12 is an illustrative diagram of an example system.

FIG. 12 is an illustrative diagram of an example system 1200, arranged in accordance with at least some implementations of the present disclosure. In various implementations, system 1200 may be a media system although system 1200 is not limited to this context. For example, system 1200 may be incorporated into a personal computer (PC), sever, laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, smart tablet or smart television), mobile internet device (MID), messaging device, data communication device, cameras (e.g. point-and-shoot cameras, super-zoom cameras, digital single-lens reflex (DSLR) cameras), and so forth. In some examples, system 1200 may be implemented via a cloud computing environment.

In various implementations, system 1200 includes a platform 1202 coupled to a display 1220. Platform 1202 may receive content from a content device such as content services device(s) 1230 or content delivery device(s) 1240 or other similar content sources. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, antenna 1213, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, DisplayPort, wireless HDMI, and/or wireless HD compliant techniques. Graphics subsystem 1215 may be integrated into processor 1210 or chipset 1205. In some implementations, graphics subsystem 1215 may be a stand-alone device communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of uni-directionally or bi-directionally communicating content between content providers and platform 1202 and/display 1220, via network 1260 or directly. It will be appreciated that the content may be communicated uni-directionally and/or bi-directionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of controller 1250 may be used to interact with user interface 1222, for example. In various embodiments, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In various embodiments, controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off" In addition, chipset 1205 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
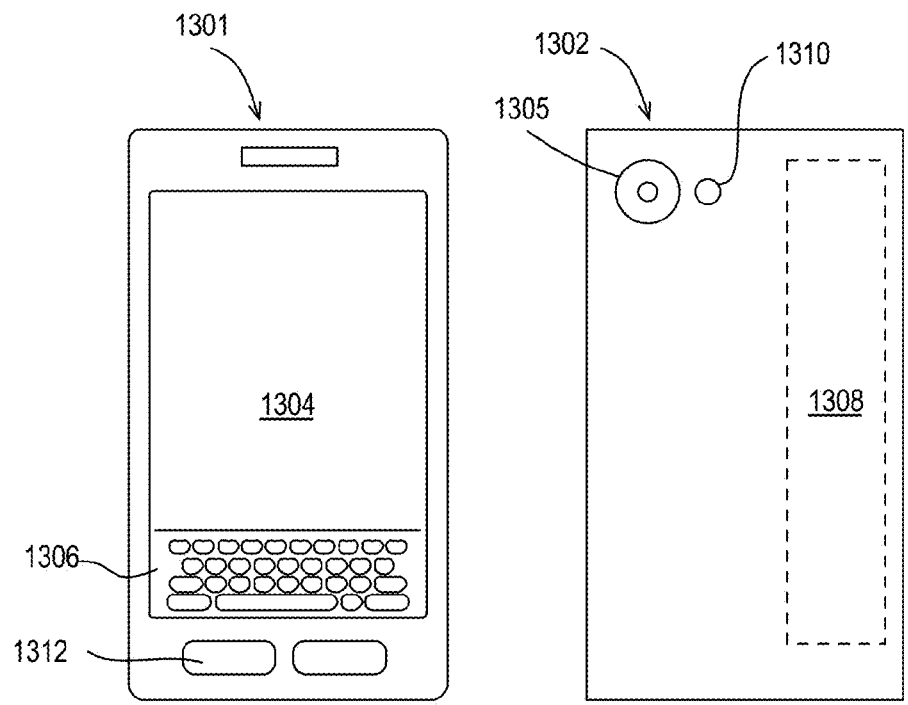
FIG. 13 illustrates an example small form factor device, all arranged in accordance with at least some implementations of the present disclosure.

As described above, system 1200 may be embodied in varying physical styles or form factors. FIG. 13 illustrates an example small form factor device 1300, arranged in accordance with at least some implementations of the present disclosure. In some examples, system 1200 may be implemented via device 1300. In other examples, device 900, system 1100, or portions thereof may be implemented via device 1300. In various embodiments, for example, device 1300 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eye-glass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 13, device 1300 may include a housing with a front 1301 and a back 1302. Device 1300 includes a display 1304, an input/output (I/O) device 1306, and an integrated antenna 1308. Device 1300 also may include navigation features 1312. I/O device 1306 may include any suitable I/O device for entering information into a mobile computing device. Examples for I/O device 1306 may include an alphanumeric keyboard, a numeric keypad, a touch pad, input keys, buttons, switches, microphones, speakers, voice recognition device and software, and so forth. Information also may be entered into device 1300 by way of microphone (not shown), or may be digitized by a voice recognition device. As shown, device 1300 may include a camera 1305 (e.g., including a lens, an aperture, and an imaging sensor) and a flash 1310 integrated into back 1302 (or elsewhere) of device 1300. In other examples, camera 1305 and flash 1310 may be integrated into front 1301 of device 1300 or both front and back cameras may be provided. Camera 1305 and flash 1310 may be components of a camera module to originate image data processed into streaming video that is output to display 1304 and/or communicated remotely from device 1300 via antenna 1308 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, method for labeling areas of an input image comprises determining an area of interest within the input image, generating a feature vector comprising a plurality of invariant features associated with the area of interest, and providing a component label for the area of interest based on an application of a machine learning classifier to the feature vector.

Further to the first embodiments, the invariant features comprise scale invariant, rotation invariant, and position invariant features.

Further to the first embodiments, the area of interest comprises a representation of at least a portion of a suspected finger within an image of a hand, the representation comprising at least one of a finger axis, a finger base point, or a finger tip point, and wherein the invariant features comprise at least one of a normalized finger length, a normalized finger width, a normalized distance from a finger base point to a center of a hand, a palm radius, a number of detected fingers in the hand image, a number of fingers pointing in the same direction as the finger, a number of fingers pointing in the opposite direction of the finger, or a number of fingers perpendicular to the finger.

Further to the first embodiments, the area of interest comprises a representation of at least a portion of a suspected finger within an image of a hand, the representation comprising at least a finger axis and a finger base point, wherein generating the plurality of invariant features comprises providing a normalized grid of cells having an axis aligned with the finger axis and an origin point at the finger base point, determining a plurality of properties for each cell of the grid of cells, and concatenating the plurality of properties to generate at least a portion of the feature vector.

Further to the first embodiments, the area of interest comprises a representation of at least a portion of a suspected finger within an image of a hand, the representation comprising at least a finger axis and a finger base point, wherein generating the plurality of invariant features comprises providing a normalized grid of cells having an axis aligned with the finger axis and an origin point at the finger base point, determining a plurality of properties for each cell of the grid of cells, and concatenating the plurality of properties to generate at least a portion of the feature vector, wherein the plurality of properties comprise at least one of a dominant orientation of gradients within a cell, an average magnitude of gradients within the cell, or a depth difference between a mean depth of the cell and a mean depth of an origin cell of the grid of cells.

Further to the first embodiments, the area of interest comprises a representation of at least a portion of a suspected finger within an image of a hand, the representation comprising at least a finger axis and a finger base point, wherein generating the plurality of invariant features comprises providing a normalized grid of cells having an axis aligned with the finger axis and an origin point at the finger base point, determining a plurality of properties for each cell of the grid of cells, and concatenating the plurality of properties to generate at least a portion of the feature vector, and/or wherein the plurality of properties comprise at least one of a dominant orientation of gradients within a cell, an average magnitude of gradients within the cell, or a depth difference between a mean depth of the cell and a mean depth of an origin cell of the grid of cells.

Further to the first embodiments, the input image comprises at least one of a 2D image, a 3D image, a depth image, or an infrared image.

Further to the first embodiments, the area of interest comprises a representation of a suspected finger within an image of a hand, a portion of a suspected finger within the image of the hand, a suspected body part within an image of a body, or a suspected face part within an image of a face.

Further to the first embodiments, the input image comprises at least one of a 2D image, a 3D image, a depth image, or an infrared image, and/or wherein the area of interest comprises a representation of a suspected finger within an image of a hand, a portion of a suspected finger within the image of the hand, a suspected body part within an image of a body, or a suspected face part within an image of a face.

Further to the first embodiments, the method further comprises identifying one or more second areas of interest within a training input image, matching the identified second areas of interest to true areas of interest within the input training image, generating one or more second feature vectors associated with the one or more second areas of interest to provide a training data set comprising the one or more second feature vectors and true labels for the second feature vectors, and training the machine learning classifier based on the training data set.

Further to the first embodiments, the machine learning classifier comprises at least one of a K-nearest neighbor classifier, a classification and regression tree classifier, a decision tree learning classifier, a random forest learning classifier, an adaptive boosting classifier, a cascading classifier, a gradient boosting tree classifier, a support vector machine, a linear classifier, a logistic regression classifier, a naïve Bayes classifier, a generalized likelihood ratio test classifier, a radial base function classifier, a multilayer perceptron classifier, a neural network classifier, a Bayesian network classifier, or a combination classifier.

In one or more second embodiments, a system for labeling areas of an input image comprises a memory configured to store image data and a central processing unit coupled to the memory, wherein the central processing unit comprises area of interest circuitry to determine an area of interest within the input image, invariant feature circuitry to generate a feature vector comprising a plurality of invariant features associated with the area of interest, and a machine learning classifier to provide a component label for the area of interest based on the feature vector.

Further to the second embodiments, the invariant features comprise scale invariant, rotation invariant, and position invariant features.

Further to the second embodiments, the area of interest comprises a representation of at least a portion of a suspected finger within an image of a hand, the representation comprising at least one of a finger axis, a finger base point, or a finger tip point, and wherein the invariant features comprise at least one of a normalized finger length, a normalized finger width, a normalized distance from a finger base point to a center of a hand, a palm radius, a number of detected fingers in the hand image, a number of fingers pointing in the same direction as the finger, a number of fingers pointing in the opposite direction of the finger, or a number of fingers perpendicular to the finger.

Further to the second embodiments, the area of interest comprises a representation of at least a portion of a suspected finger within an image of a hand, the representation comprising at least a finger axis and a finger base point, the invariant feature circuitry to provide a normalized grid of cells having an axis aligned with the finger axis and an origin point at the finger base point, to determine a plurality of properties for each cell of the grid of cells, and to concatenate the plurality of properties to generate at least a portion of the feature vector.

Further to the second embodiments, the area of interest comprises a representation of at least a portion of a suspected finger within an image of a hand, the representation comprising at least a finger axis and a finger base point, the invariant feature circuitry to provide a normalized grid of cells having an axis aligned with the finger axis and an origin point at the finger base point, to determine a plurality of properties for each cell of the grid of cells, and to concatenate the plurality of properties to generate at least a portion of the feature vector, wherein the plurality of properties comprise at least one of a dominant orientation of gradients within a cell, an average magnitude of gradients within the cell, or a depth difference between a mean depth of the cell and a mean depth of an origin cell of the grid of cells.

Further to the second embodiments, the area of interest comprises a representation of at least a portion of a suspected finger within an image of a hand, the representation comprising at least a finger axis and a finger base point, the invariant feature circuitry to provide a normalized grid of cells having an axis aligned with the finger axis and an origin point at the finger base point, to determine a plurality of properties for each cell of the grid of cells, and to concatenate the plurality of properties to generate at least a portion of the feature vector, and/or wherein the plurality of properties comprise at least one of a dominant orientation of gradients within a cell, an average magnitude of gradients within the cell, or a depth difference between a mean depth of the cell and a mean depth of an origin cell of the grid of cells.

Further to the second embodiments, the input image comprises at least one of a 2D image, a 3D image, a depth image, or an infrared image.

Further to the second embodiments, the area of interest comprises a representation of a suspected finger within an image of a hand, a portion of a suspected finger within the image of the hand, a suspected body part within an image of a body, or a suspected face part within an image of a face.

Further to the second embodiments, the input image comprises at least one of a 2D image, a 3D image, a depth image, or an infrared image, and/or wherein the area of interest comprises a representation of a suspected finger within an image of a hand, a portion of a suspected finger within the image of the hand, a suspected body part within an image of a body, or a suspected face part within an image of a face.

Further to the second embodiments, the machine learning classifier comprises at least one of a K-nearest neighbor classifier, a classification and regression tree classifier, a decision tree learning classifier, a random forest learning classifier, an adaptive boosting classifier, a cascading classifier, a gradient boosting tree classifier, a support vector machine, a linear classifier, a logistic regression classifier, a naïve Bayes classifier, a generalized likelihood ratio test classifier, a radial base function classifier, a multilayer perceptron classifier, a neural network classifier, a Bayesian network classifier, or a combination classifier.

In one or more third embodiments, a system for labeling areas of an input image comprises means for determining an area of interest within the input image, means for generating a feature vector comprising a plurality of invariant features associated with the area of interest, and means for providing a component label for the area of interest based on an application of a machine learning classifier to the feature vector.

Further to the third embodiments, the invariant features comprise scale invariant, rotation invariant, and position invariant features.

Further to the third embodiments, the area of interest comprises a representation of at least a portion of a suspected finger within an image of a hand, the representation comprising at least one of a finger axis, a finger base point, or a finger tip point, and wherein the invariant features comprise at least one of a normalized finger length, a normalized finger width, a normalized distance from a finger base point to a center of a hand, a palm radius, a number of detected fingers in the hand image, a number of fingers pointing in the same direction as the finger, a number of fingers pointing in the opposite direction of the finger, or a number of fingers perpendicular to the finger.

Further to the third embodiments, the area of interest comprises a representation of at least a portion of a suspected finger within an image of a hand, the representation comprising at least a finger axis and a finger base point, and the system further comprises means for providing a normalized grid of cells having an axis aligned with the finger axis and an origin point at the finger base point, means for determining a plurality of properties for each cell of the grid of cells, and means for concatenating the plurality of properties to generate at least a portion of the feature vector.

Further to the third embodiments, the area of interest comprises a representation of at least a portion of a suspected finger within an image of a hand, the representation comprising at least a finger axis and a finger base point, and the system further comprises means for providing a normalized grid of cells having an axis aligned with the finger axis and an origin point at the finger base point, means for determining a plurality of properties for each cell of the grid of cells, and means for concatenating the plurality of properties to generate at least a portion of the feature vector, wherein the plurality of properties comprise at least one of a dominant orientation of gradients within a cell, an average magnitude of gradients within the cell, or a depth difference between a mean depth of the cell and a mean depth of an origin cell of the grid of cells.

Further to the third embodiments, the input image comprises at least one of a 2D image, a 3D image, a depth image, or an infrared image.

Further to the third embodiments, the area of interest comprises a representation of a suspected finger within an image of a hand, a portion of a suspected finger within the image of the hand, a suspected body part within an image of a body, or a suspected face part within an image of a face.

Further to the third embodiments, the machine learning classifier comprises at least one of a K-nearest neighbor classifier, a classification and regression tree classifier, a decision tree learning classifier, a random forest learning classifier, an adaptive boosting classifier, a cascading classifier, a gradient boosting tree classifier, a support vector machine, a linear classifier, a logistic regression classifier, a naïve Bayes classifier, a generalized likelihood ratio test classifier, a radial base function classifier, a multilayer perceptron classifier, a neural network classifier, a Bayesian network classifier, or a combination classifier.

In one or more fourth embodiments, at least one machine readable medium comprises a plurality of instructions that, in response to being executed on a device, cause the device to label areas of an input image by determining an area of interest within the input image, generating a feature vector comprising a plurality of invariant features associated with the area of interest, and providing a component label for the area of interest based on an application of a machine learning classifier to the feature vector.

Further to the fourth embodiments, the invariant features comprise scale invariant, rotation invariant, and position invariant features.

Further to the fourth embodiments, the area of interest comprises a representation of at least a portion of a suspected finger within an image of a hand, the representation comprising at least one of a finger axis, a finger base point, or a finger tip point, and wherein the invariant features comprise at least one of a normalized finger length, a normalized finger width, a normalized distance from a finger base point to a center of a hand, a palm radius, a number of detected fingers in the hand image, a number of fingers pointing in the same direction as the finger, a number of fingers pointing in the opposite direction of the finger, or a number of fingers perpendicular to the finger.

Further to the fourth embodiments, the area of interest comprises a representation of at least a portion of a suspected finger within an image of a hand, the representation comprising at least a finger axis and a finger base point, and the machine readable medium comprises further instructions that cause the device to label areas of the input image by providing a normalized grid of cells having an axis aligned with the finger axis and an origin point at the finger base point, determining a plurality of properties for each cell of the grid of cells, and concatenating the plurality of properties to generate at least a portion of the feature vector.

Further to the fourth embodiments, the area of interest comprises a representation of at least a portion of a suspected finger within an image of a hand, the representation comprising at least a finger axis and a finger base point, and the machine readable medium comprises further instructions that cause the device to label areas of the input image by providing a normalized grid of cells having an axis aligned with the finger axis and an origin point at the finger base point, determining a plurality of properties for each cell of the grid of cells, and concatenating the plurality of properties to generate at least a portion of the feature vector, wherein the plurality of properties comprise at least one of a dominant orientation of gradients within a cell, an average magnitude of gradients within the cell, or a depth difference between a mean depth of the cell and a mean depth of an origin cell of the grid of cells.

Further to the fourth embodiments, the area of interest comprises a representation of a suspected finger within an image of a hand, a portion of a suspected finger within the image of the hand, a suspected body part within an image of a body, or a suspected face part within an image of a face.

Further to the fourth embodiments, the machine readable medium further comprises instructions that, in response to being executed on the device, cause the device to label areas of an input image by identifying one or more second areas of interest within a training input image, matching the identified second areas of interest to true areas of interest within the input training image, generating one or more second feature vectors associated with the one or more second areas of interest to provide a training data set comprising the one or more second feature vectors and true labels for the second feature vectors, and training the machine learning classifier based on the training data set.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for labeling areas of an input image comprising:
   determining an area of interest within the input image;
   providing a normalized grid of cells over the area of interest of the input image;
   determining a plurality of properties corresponding to the normalized grid of cells, the plurality of properties including multiple cell properties for each cell of the normalized grid of cells, the multiple cell properties comprising a dominant orientation of gradients within each cell, an average magnitude of gradients within each cell, and a depth difference between a mean depth of each cell and a mean depth of an origin cell of the grid of cells;
   generating a feature vector comprising a plurality of invariant features associated with the area of interest, the invariant features comprising a concatenation of the plurality of properties corresponding to the normalized grid of cells; and
   providing a component label for the area of interest based on an application of a machine learning classifier to the feature vector.

2. The method of claim 1, wherein the invariant features comprise scale invariant, rotation invariant, and position invariant features.

3. The method of claim 1, wherein the area of interest comprises a representation of at least a portion of a suspected finger within an image of a hand, the representation comprising at least one of a finger axis, a finger base point, or a finger tip point, and wherein the invariant features comprise at least one of a normalized finger length, a normalized finger width, a normalized distance from a finger base point to a center of a hand, a palm radius, a number of detected fingers in the hand image, a number of fingers pointing in the same direction as the finger, a number of fingers pointing in the opposite direction of the finger, or a number of fingers perpendicular to the finger.

4. The method of claim 1, wherein the area of interest comprises a representation of at least a portion of a suspected finger within an image of a hand, the representation comprising at least a finger axis, a finger base point, and a finger tip point, and wherein the invariant features comprise a normalized finger length, a normalized finger width, a normalized distance from a finger base point to a center of a hand, a palm radius, a number of detected fingers in the hand image, a number of fingers pointing in the same direction as the finger, a number of fingers pointing in the opposite direction of the finger, and a number of fingers perpendicular to the finger.

5. The method of claim 1, wherein the input image comprises at least one of a 2D image, a 3D image, a depth image, or an infrared image.

6. The method of claim 1, wherein the area of interest comprises a representation of a suspected finger within an image of a hand, a portion of a suspected finger within the image of the hand, a suspected body part within an image of a body, or a suspected face part within an image of a face.

7. The method of claim 1, wherein the machine learning classifier comprises at least one of a K-nearest neighbor classifier, a classification and regression tree classifier, a decision tree learning classifier, a random forest learning classifier, an adaptive boosting classifier, a cascading classifier, a gradient boosting tree classifier, a support vector machine, a linear classifier, a logistic regression classifier, a naive Bayes classifier, a generalized likelihood ratio test classifier, a radial base function classifier, a multilayer perceptron classifier, a neural network classifier, a Bayesian network classifier, or a combination classifier.

8. A system for labeling areas of an input image comprising:
   a memory configured to store image data; and
   a processor coupled to the memory, the processor to determine an area of interest within the input image, to provide a normalized grid of cells over the area of interest of the input image, to determine a plurality of properties corresponding to the normalized grid of cells, the plurality of properties including multiple cell properties for each cell of the normalized grid of cells, the multiple cell properties comprising a dominant orientation of gradients within each cell, an average magnitude of gradients within each cell, and a depth difference between a mean depth of each cell and a mean depth of an origin cell of the grid of cells, to generate a feature vector comprising a plurality of invariant features associated with the area of interest, the invariant features comprising a concatenation of the plurality of properties corresponding to the normalized grid of cells, and to provide a component label for the area of interest based on an application of a machine learning classifier to the feature vector.

9. The system of claim 8, wherein the invariant features comprise scale invariant, rotation invariant, and position invariant features.

10. The system of claim 8, wherein the area of interest comprises a representation of at least a portion of a suspected finger within an image of a hand, the representation comprising at least one of a finger axis, a finger base point, or a finger tip point, and wherein the invariant features comprise at least one of a normalized finger length, a normalized finger width, a normalized distance from a finger base point to a center of a hand, a palm radius, a number of detected fingers in the hand image, a number of fingers pointing in the same direction as the finger, a number of fingers pointing in the opposite direction of the finger, or a number of fingers perpendicular to the finger.

11. The system of claim 8, wherein the area of interest comprises a representation of at least a portion of a suspected finger within an image of a hand, the representation comprising at least a finger axis, a finger base point, and a finger tip point, and wherein the invariant features comprise a normalized finger length, a normalized finger width, a normalized distance from a finger base point to a center of a hand, a palm radius, a number of detected fingers in the hand image, a number of fingers pointing in the same direction as the finger, a number of fingers pointing in the opposite direction of the finger, and a number of fingers perpendicular to the finger.

12. The system of claim 8, wherein the input image comprises at least one of a 2D image, a 3D image, a depth image, or an infrared image.

13. The system of claim 8, wherein the area of interest comprises a representation of a suspected finger within an image of a hand, a portion of a suspected finger within the image of the hand, a suspected body part within an image of a body, or a suspected face part within an image of a face.

14. The system of claim 8, wherein the machine learning classifier comprises at least one of a K-nearest neighbor classifier, a classification and regression tree classifier, a decision tree learning classifier, a random forest learning classifier, an adaptive boosting classifier, a cascading classifier, a gradient boosting tree classifier, a support vector machine, a linear classifier, a logistic regression classifier, a naive Bayes classifier, a generalized likelihood ratio test classifier, a radial base function classifier, a multilayer perceptron classifier, a neural network classifier, a Bayesian network classifier, or a combination classifier.

15. At least one non-transitory machine readable medium comprising a plurality of instructions that, in response to being executed on a device, cause the device to label areas of an input image by:

determining an area of interest within the input image;

providing a normalized grid of cells over the area of interest of the input image;

determining a plurality of properties corresponding to the normalized grid of cells, the plurality of properties including multiple cell properties for each cell of the normalized grid of cells, the multiple cell properties comprising a dominant orientation of gradients within each cell, an average magnitude of gradients within each cell, and a depth difference between a mean depth of each cell and a mean depth of an origin cell of the grid of cells;

generating a feature vector comprising a plurality of invariant features associated with the area of interest, the invariant features comprising a concatenation of the plurality of properties corresponding to the normalized grid of cells; and providing a component label for the area of interest based on an application of a machine learning classifier to the feature vector.

16. The machine readable medium of claim 15, wherein the invariant features comprise scale invariant, rotation invariant, and position invariant features.

17. The machine readable medium of claim 15, wherein the area of interest comprises a representation of at least a portion of a suspected finger within an image of a hand, the representation comprising at least one of a finger axis, a finger base point, or a finger tip point, and wherein the invariant features comprise at least one of a normalized finger length, a normalized finger width, a normalized distance from a finger base point to a center of a hand, a palm radius, a number of detected fingers in the hand image, a number of fingers pointing in the same direction as the finger, a number of fingers pointing in the opposite direction of the finger, or a number of fingers perpendicular to the finger.

18. The machine readable medium of claim 15, wherein the area of interest comprises a representation of at least a portion of a suspected finger within an image of a hand, the representation comprising at least a finger axis a finger base point, and a finger tip point, and wherein the invariant features comprise a normalized finger length, a normalized finger width, a normalized distance from a finger base point to a center of a hand, a palm radius, a number of detected fingers in the hand image, a number of fingers pointing in the same direction as the finger, a number of fingers pointing in the opposite direction of the finger, and a number of fingers perpendicular to the finger.

19. The machine readable medium of claim 18, wherein the input image comprises at least one of a 2D image, a 3D image, a depth image, or an infrared image.

20. The machine readable medium of claim 15, wherein the area of interest comprises a representation of a suspected finger within an image of a hand, a portion of a suspected finger within the image of the hand, a suspected body part within an image of a body, or a suspected face part within an image of a face.

* * * * *